US012774248B2

(12) United States Patent
Romaniuk et al.

(10) Patent No.: US 12,774,248 B2
(45) Date of Patent: Oct. 27, 2026

(54) COMPOSITIONS COMPRISING LIME AND POZZOLAN, AND ASSOCIATED SYSTEMS AND METHODS

(71) Applicant: GRAYMONT WESTERN CANADA INC., Richmond (CA)

(72) Inventors: Nikolas Andrei Romaniuk, Edmonton (CA); Lucas McFarlane, Salt Lake City, UT (US); Narain Hariharan, South Jordan, UT (US)

(73) Assignee: GRAYMONT WESTERN CANADA INC., Richmond (CA)

( * ) Notice: Subject to any disclaimer, the term of this patent is extended or adjusted under 35 U.S.C. 154(b) by 0 days.

(21) Appl. No.: 18/982,623

(22) Filed: Dec. 16, 2024

(65) Prior Publication Data

US 2025/0197280 A1 Jun. 19, 2025

Related U.S. Application Data

(60) Provisional application No. 63/610,353, filed on Dec. 14, 2023.

(51) Int. Cl.
*C04B 14/14* (2006.01)
*C04B 7/34* (2006.01)
*C04B 22/14* (2006.01)

(52) U.S. Cl.
CPC ................ *C04B 7/34* (2013.01); *C04B 14/14* (2013.01); *C04B 22/142* (2013.01)

(58) Field of Classification Search
CPC ......... C04B 7/34; C04B 14/14; C04B 22/142; C04B 41/5081; C04B 41/508; C04B 41/5084; C04B 41/5085; C04B 41/5088; C04B 2235/5224; C04B 2235/5228; C04B 28/12; C04B 7/52; C04B 28/184; C04B 2111/00215; C04B 2111/00724; C04B 2111/10
See application file for complete search history.

(56) References Cited

U.S. PATENT DOCUMENTS 2,669,542 A 2/1954 Dooley
4,227,996 A 10/1980 Levine et al.
5,549,859 A * 8/1996 Andersen ................ B28B 13/06 264/102
7,520,371 B2 4/2009 Lockledge et al.
7,799,128 B2 9/2010 Guynn et al.
7,972,432 B2 7/2011 Guynn et al.
8,323,399 B2 12/2012 Guynn et al.
8,377,201 B2 2/2013 Guynn et al.
8,414,700 B2 4/2013 Guynn et al.
8,551,245 B2 10/2013 Guynn et al.
8,974,593 B2 3/2015 Guynn et al.
9,067,824 B1 6/2015 Hansen et al.
9,102,567 B1 8/2015 Hansen et al.
9,238,591 B2 1/2016 Guynn et al.
9,272,953 B2 3/2016 Guynn et al.
9,297,082 B2 3/2016 Licht
9,561,983 B2 2/2017 Thomas et al.
9,611,174 B2 4/2017 Thomas et al.
9,868,844 B2 1/2018 McAfee et al.
9,957,196 B1 5/2018 Guynn
10,017,418 B2 7/2018 Thomas et al.
10,131,575 B2 11/2018 Guynn
10,233,116 B1 3/2019 Guynn
10,315,956 B2 6/2019 Morrison et al.
10,370,295 B2 8/2019 Thomas et al.
10,377,667 B2 8/2019 Thomas et al.
10,457,601 B2 10/2019 Thomas et al.
(Continued)

FOREIGN PATENT DOCUMENTS

CA 2739657 C 2/2016
CA 2991699 A1 1/2017
(Continued)

OTHER PUBLICATIONS

Hamdy et al. Hydration and characteristics of metakaolin pozzolanic cement pastes, HBRC Journal, vol. 14, Iss 2, 2018, pp. 150-158, doi: 10.1016/j.hbrcj.2015.05.005. (Year: 2018).*
Wu et al. "Effects of sodium sulfate on the hydration and properties of lime-based low carbon cementitious materials", Journal of Cleaner Production, v220, 2019, pp. 677-626. DOI:10.1016/j.jclepro.2019.02.186. (Year: 2019).*
Marcelino et al. (2016). Evaluation of pyrite and pyrrhotite in concretes. Revista Ibracon De Estruturas E Materiais, 9(3), 484-493. DOIO:10.1590/S1983-41952016000300009 (Year: 2016).*
"[No Author Listed], LumiShield Chemistry. LumiShield Technologies, Inc. Pittsburgh, PA Accessed Oct. 15, 2021 as available Jan. 31, 2019 from https://web.archive.org/web/20190131025944/http://lumishieldtech.com/chemistry .html. 1 page."
(Continued)

*Primary Examiner* — Marites A Guino-O Uzzle
(74) *Attorney, Agent, or Firm* — Ashurst Perkins Coie LLP; Vijay S. Kumar

(57) ABSTRACT

Lime-based cement extender or cement replacement compositions and formulations, and associated systems and methods are disclosed herein. In some embodiments, a lime-based cement extender or cement replacement composition includes at least 5% by weight lime particles and at least 50% by weight pozzolan particles. In some embodiments, the pozzolan particles include silicon dioxide and aluminum oxide. In some embodiments, composition can be combined with admixtures and/or aggregates to produce a formulation. The formation can have at least 5,000 ppm soluble sulfate and an alumina:silica ratio of at least 0.2:1. Methods of accelerating formation of calcium aluminum sulfates to avoid sulfate attacks during critical periods include producing a formulation with high aluminum oxide content, admixtures configured to accelerate certain chemical reactions, and omitting limestone. Methods of delaying formation of calcium aluminum sulfates to avoid sulfate attacks during critical periods include producing a formulation with admixtures configured to delay certain chemical reactions.

21 Claims, 7 Drawing Sheets

(56) References Cited

U.S. PATENT DOCUMENTS

| | | | |
|---|---|---|---|
| 10,494,298 | B1 | 12/2019 | Guynn |
| 10,526,248 | B2 | 1/2020 | Guynn |
| 10,689,292 | B2 | 6/2020 | Thomas et al. |
| 10,730,805 | B2 | 8/2020 | Guynn |
| 10,737,980 | B2 | 8/2020 | Guynn |
| 10,829,414 | B2 | 11/2020 | Thomas et al. |
| 10,906,821 | B2 | 2/2021 | Trifkovic et al. |
| 10,968,137 | B1 | 4/2021 | Guynn |
| 11,168,029 | B2 | 11/2021 | Guynn |
| 11,299,424 | B2 | 4/2022 | Thomas et al. |
| 11,319,248 | B2 | 5/2022 | Thomas et al. |
| 11,472,737 | B1 | 10/2022 | Guynn |
| RE49,415 | E | 2/2023 | Guynn |
| 11,639,303 | B2 | 5/2023 | Trifkovic et al. |
| 11,655,186 | B2 | 5/2023 | Guynn |
| 11,725,148 | B2 | 8/2023 | Romaniuk et al. |
| 11,746,048 | B2 | 9/2023 | Guynn |
| 11,773,018 | B2 | 10/2023 | Thomas et al. |
| 11,884,589 | B2 | 1/2024 | Thomas et al. |
| 11,912,593 | B2 | 2/2024 | Trifkovic et al. |
| 11,919,813 | B2 | 3/2024 | Romaniuk et al. |
| 12,091,361 | B2 | 9/2024 | Romaniuk et al. |
| 12,122,722 | B2 | 10/2024 | Hariharan et al. |
| 12,151,974 | B2 | 11/2024 | Guynn |
| 12,221,380 | B2 | 2/2025 | Thomas et al. |
| 12,304,838 | B2 | 5/2025 | Trifkovic et al. |
| 12,371,622 | B2 | 7/2025 | Romaniuk et al. |
| 2004/0187740 | A1 | 9/2004 | Timmons |
| 2005/0109603 | A1 | 5/2005 | Graham |
| 2008/0124269 | A1 | 5/2008 | Daudey et al. |
| 2008/0245660 | A1 | 10/2008 | Little et al. |
| 2010/0058109 | A1 | 3/2010 | Chang et al. |
| 2010/0068109 | A1 | 3/2010 | Comrie |
| 2010/0101955 | A1 | 4/2010 | Nocera et al. |
| 2010/0154593 | A1 | 6/2010 | Ratchev et al. |
| 2011/0044882 | A1 | 2/2011 | Buckley et al. |
| 2011/0061610 | A1 | 3/2011 | Speirs et al. |
| 2011/0182786 | A1 | 7/2011 | Burba, III |
| 2012/0121491 | A1 | 5/2012 | Rau |
| 2012/0145046 | A1 | 6/2012 | Hansen et al. |
| 2013/0112115 | A1 | 5/2013 | Sotillo et al. |
| 2014/0010743 | A1 | 1/2014 | Kosmoski et al. |
| 2014/0311951 | A1 | 10/2014 | Esmaeili et al. |
| 2015/0343373 | A1 | 12/2015 | Balfe et al. |
| 2016/0137551 | A1 | 5/2016 | Le Gouil et al. |
| 2017/0022110 | A1 | 1/2017 | Ulrike et al. |
| 2018/0029934 | A1 | 2/2018 | Monkman et al. |
| 2018/0037501 | A1 | 2/2018 | Guynn et al. |
| 2018/0148628 | A1 | 5/2018 | Vlasopoulos et al. |
| 2018/0251403 | A1 | 9/2018 | Boehringer et al. |
| 2018/0305254 | A1 | 10/2018 | Ben Haha et al. |
| 2019/0040347 | A1 | 2/2019 | Kim et al. |
| 2019/0135690 | A1 | 5/2019 | Sánchez Dolado et al. |
| 2019/0218445 | A1 | 7/2019 | Pernites et al. |
| 2020/0079664 | A1 | 3/2020 | Leikam et al. |
| 2020/0123054 | A1 | 4/2020 | Guynn |
| 2021/0094879 | A1 | 4/2021 | Masic et al. |
| 2021/0107840 | A1 | 4/2021 | Gong |
| 2021/0147296 | A1 | 5/2021 | Byrd |
| 2021/0179492 | A1 | 6/2021 | Hofffmann |
| 2021/0292231 | A1 | 9/2021 | Alangari et al. |
| 2021/0309570 | A1 | 10/2021 | Guynn |
| 2022/0009846 | A1 | 1/2022 | Jandhyala et al. |
| 2022/0017419 | A1 | 1/2022 | Guynn |
| 2022/0064063 | A1 | 3/2022 | Chiang et al. |
| 2022/0106235 | A1 | 4/2022 | Guynn |
| 2022/0195306 | A1* | 6/2022 | Romaniuk .............. C04B 18/12 |
| 2023/0036470 | A1 | 2/2023 | Finke et al. |
| 2023/0174396 | A1 | 6/2023 | Chiang |
| 2023/0271882 | A1 | 8/2023 | Sperry, III |
| 2023/0313386 | A1 | 10/2023 | Ellis et al. |
| 2023/0330724 | A1 | 10/2023 | Chiang |
| 2023/0406764 | A1 | 12/2023 | Guynn |
| 2024/0043330 | A1 | 2/2024 | Pandey et al. |
| 2024/0174565 | A1 | 5/2024 | Guynn |
| 2025/0011230 | A1 | 1/2025 | Pandey et al. |
| 2025/0100934 | A1 | 3/2025 | Guynn |

FOREIGN PATENT DOCUMENTS

| | | | | |
|---|---|---|---|---|
| CA | 3047341 | A1 | 7/2018 | |
| CA | 3125963 | A1 | 7/2020 | |
| CA | 3167248 | A1 | 6/2022 | |
| CA | 3203524 | A1 | 6/2023 | |
| CA | 3051243 | C | 7/2023 | |
| CA | 3047562 | C | 9/2023 | |
| CN | 106966620 | A | 7/2017 | |
| CN | 108117356 | A | 6/2018 | |
| CN | 109400089 | A | 3/2019 | |
| CN | 112225501 | A | 1/2021 | |
| CN | 113149542 | A | 7/2021 | |
| CN | 214183391 | U | 9/2021 | |
| CN | 114954785 | A | 8/2022 | |
| CN | 114931853 | B | 11/2022 | |
| DE | 102023106210 | A1 | 9/2024 | |
| DE | 102023106217 | A1 | 9/2024 | |
| DE | 102023106221 | A1 | 9/2024 | |
| DE | 102023106222 | A1 | 9/2024 | |
| EP | 0640062 | B1 | 2/1996 | |
| EP | 2816140 | A1 | 12/2014 | |
| FR | 2885928 | A1 | 11/2006 | |
| GB | 1008196 | A | 10/1965 | |
| GB | 202416425 | | 12/2024 | |
| GB | 2638122 | A | 8/2025 | |
| GB | 2639713 | A | 10/2025 | |
| JP | 2007177586 | A | 7/2007 | |
| JP | 4796225 | B2 | 8/2011 | |
| JP | 2019163623 | A | 9/2019 | |
| KR | 20090092068 | A | 8/2009 | |
| KR | 10-2017-009060 | A | 8/2017 | |
| KR | 10-1935491 | B1 | 1/2019 | |
| KR | 20190004791 | A | 1/2019 | |
| KR | 2019004791 | W | 4/2019 | |
| KR | 20190047911 | A | 5/2019 | |
| KR | 2013073025 | A | 7/2023 | |
| LU | 503619 | B1 | 9/2024 | |
| LU | 503621 | B1 | 9/2024 | |
| LU | 503623 | B1 | 9/2024 | |
| LU | 503625 | B1 | 9/2024 | |
| MX | 2015017701 | A1 | 6/2017 | |
| WO | 2006127652 | A2 | 11/2006 | |
| WO | 2008124538 | A1 | 10/2008 | |
| WO | 2012142547 | A1 | 10/2012 | |
| WO | 2014092667 | A1 | 6/2014 | |
| WO | 2018078672 | A1 | 5/2018 | |
| WO | 2018087697 | A1 | 5/2018 | |
| WO | 2019023339 | A1 | 1/2019 | |
| WO | 2019133702 | A1 | 7/2019 | |
| WO | 2020028292 | A1 | 2/2020 | |
| WO | 2020150449 | A1 | 7/2020 | |
| WO | 2020186178 | A1 | 9/2020 | |
| WO | 2021030529 | A1 | 2/2021 | |
| WO | 2021188154 | A1 | 9/2021 | |
| WO | 2021222585 | A1 | 11/2021 | |
| WO | 2022020470 | A1 | 1/2022 | |
| WO | 2022020572 | A1 | 1/2022 | |
| WO | 2022133600 | A1 | 6/2022 | |
| WO | WO-2022204059 | A1 * | 9/2022 | ............. C04B 28/10 |
| WO | 2022216741 | A1 | 10/2022 | |
| WO | 2022221334 | A1 | 10/2022 | |
| WO | 2023108054 | A1 | 6/2023 | |
| WO | 2023122768 | A1 | 6/2023 | |
| WO | 2023150796 | A1 | 8/2023 | |
| WO | 2023250495 | A1 | 12/2023 | |
| WO | 2023250495 | A2 | 12/2023 | |
| WO | 2024026575 | A1 | 2/2024 | |
| WO | 2024059557 | A1 | 3/2024 | |
| WO | 2024188957 | A1 | 9/2024 | |
| WO | 2024188958 | A1 | 9/2024 | |
| WO | 2024188960 | A1 | 9/2024 | |

(56) References Cited

FOREIGN PATENT DOCUMENTS

WO 2024207091 A1 10/2024
WO 2025125579 A1 6/2025

OTHER PUBLICATIONS

"Azo Materials. (2024). Silica-Silicon Dioxide (SiO2) retrieved from the internet on Mar. 6, 2024 from <https://www.azom.com/article.aspx? ArticleID=1114> 5 pages."
"Encyclopedia Britannica. (2016). "Sedimentary rock," retrieved from the internet on Mar. 7, 2024 from <https://www.britannica.com/science/sedimentary-rock/ Limestones-and-dolomites and wayback https://web.archive.org/web/20160420201820/https://www_ britannic".
"International Search Report and Written Opinion", issued for PCT/US2022/082301 on Apr. 28, 2023 by European Patent Office, Apr. 28, 2023.
"International Search Report and Written Opinion for International App. No. PCT/US2023/085160; Date of Filing: Dec. 20, 2023; Applicant: Graymont Western Canada Inc.; Date of Mailing: May 1, 2024, 11 pages."
"Mintek Team, What is Lime? And the Difference Between Lime and Limestone? [retrieved from internet on Dec. 5, 2024 from URL: https://mintekresources.com/what-is-lime#.:=:test=Hydrated%20is%20produced%20when.number%20of%20applications%2C%20especially%20aspha", 2020.
"No Author Listed], Mineral Commodity Summaries. U.S. Department of the Interior, U.S. Geological Survey. Jan. 2018. 204 pages."
"No Author Listed], Mini Chlor Alkali Plant. SkidPlant. Chenai, India. Accessed Oct. 15, 2021 as available Jan. 10, 2019 from https://web.archive.org/web/20190110233048/http://www.skidplant.com/mini-chlor-alkali-plant 3 pages."
"No Author Listed], Renewable Power Generation Costs in 2017. International Renewable Energy Agency (IRENA), Abu Dhabi. 2018. 160 pages."
Alonso et al., "(2001). "Alkaline activation of metakaolin and calcium hydroxide mixtures: influence of temperature, activator concentration and solids ratio," Materials Letters 47: 55-62."
Barker et al.,, "CO2 Capture in the Cement Industry. IEA Greenhouse Gas R&D Programme. Cheltenham, Glos., UK. 2008; 1-221."
Belevi et al.,, "Factors Determining the Element Behavior in Municipal Solid Waste Incinerators. 1. Field Studies. Environ. Sci. Technol. May 12, 2000;34(12):2501-2506."
Bjerge et al., "CO2 Capture in the Cement Industry, Norcem CO2 Capture Project (Norway). Energy Procedia. 2014;63:6455-63."
Blunt et al.,, "Carbon Dioxide in Enhanced Oil Recovery. Energy Convers. Mgmt. 1993;34(9-11 ):1197-1204."
Carrasco-Maldonado et al.,, "Oxy-fuel combustion technology for cement production—State of the art research and technology development. International Journal of Greenhouse Gas Control. 2016;45: 189-99. Epub Jan. 4, 2016."
Chen et al.,, "(2009). "Incorporation of waste materials into portland cement clinker synthesized from natural raw materials," J Mater Sci 44: 2617-2627."
Chen et al.,, "Environmental impact of cement production: detail of the different processes and cement plant variability evaluation. Journal of Cleaner Production. 201O;18(5):478-485. Epub Jan. 4, 2010."
Davis et al.,, "Net-zero emissions energy systems. Science. Jun. 29, 2018; 360(6396) 9 pages. Supplementary Material included. 27 pages total."
Delgado et al.,, "CO2 Balance in a Compression and Purification Unit (CPU). Energy Procedia. 2014; 63:322-31."
Dowling et al.,, "Lime in the limelight. Journal of Cleaner Production. 2015;92:13-22. Epub Dec. 20, 2014."
Dubois et al.,, "Study of the post-combustion CO2 capture applied to conventional and partial oxy-fuel cement plants. Energy Procedia. 2017; 114:6181-96."
Ellis et al., "(2020). "Toward Electrochemical Synthesis of Cement—An Electrolyzer-Based Process for Decarbonating :;aCO3 While Producing Useful Gas Streams," PNAS 117(23): 12584-12591".
Free, M.L.,, "Hydrometallurgy—Fundamentals and Applications. 2013. John Wiley & Sons, Inc. 451 pages."
Funari et al.,, "Solid residues from Italian municipal solid waste incinerators: A source for ""critical"" raw materials. Waste Manag. Nov. 2015; 45:206-16. Epub Dec. 12, 2014. Pre-publication version provided. 11 pages."
Gardarsdottir et al.,, "Comparison of Technologies for CO2 Capture from Cement Production—Part 2: Cost Analysis. Energies. Feb. 10, 2019;12(3):1-20."
Geels et al.,, "Sociotechnical transitions for deep decarbonization. Science. Sep. 22, 2017;357(6357): 1242-1244."
Gray, H.B.,, "Powering the planet with solar fuel. Nature Chemistry. Mar. 19, 2009;1:7; 2 pages."
Haruta et al.,, "Catalytic Combustion of Hydrogen I-Its Role in Hydrogen Utilization System and Screening of Catalyst Materials. Int. J. Hydrogen Energy. 1981;6(6):601-8."
Hasanbeigi et al.,, "Emerging energy-efficiency and CO2 emission-reduction technologies for cement and concrete production: A technical review. Renewable and Sustainable Energy Reviews. Aug. 30, 2012;16(8):6220-6238."
Ibrahim et al.,, "(2018). "Metakaolin as an Active Pozzolan for Cement That Improves Its Properties and Reduces Its Pollution Hazard," Journal of Minerals and Materials Characterization and Engineering 6: 86-104."
Imbabi et al.,, "Trends and developments in green cement and concrete technology. International Journal of Sustainable Built Environment. 2012; 1:194-216. doi: 10.1016/i.iisbe.2013.05.001."
Irabien et al.,, "(1990). "Thermal Dehydration of Calcium Hydroxide. 1. Kinetic Model and Parameters," Ind. Eng. Chem. Res. 29(8): 1599-1606."
Janssen, G.J.M.,, "Modelling study of CO2 poisoning on PEMFC anodes. Journal of Power Sources. Jul. 3, 2004;136:45-54."
Joseph et al.,, "The Use of Municipal Solid Waste Incineration Ash in Various Building Materials: A Belgian Point of View. Materials. Jan. 16, 2018; 11(141): 1-30."
Keith et al.,, "A Process for Capturing CO2 from the Atmosphere. Joule. Aug. 15, 2018;2(8): 1573-94."
Kelly et al.,, "Historical Statistics for Mineral and Material Commodities in the United States, US Geological Survey. Reston, VA Accessed Jan. 7, 2009 as updated Apr. 17, 2008 from http://minerals.usga.gov/ds/2005/140/. 8 pages."
Lassagne et al.,, "Techno-economic study of CO2 capture for aluminum primary production for different electrolytic cell ventilation rates. Chemical Engineering Journal. Jun. 26, 2013;230:338-50."
Lawal et al.,, "Dynamic modelling and analysis of post-combustion CO2 chemical absorption process for coal-fired power plants. Fuel. Jun. 2, 2010;89(10):2791-2801".
Lehne et al.,, "Making Concrete Change; Innovation in Low-carbon Cement and Concrete. Chatham House, London, UK. Jun. 2018. 138 pages."
Li et al.,, "Greenhouse Gas Emissions, Energy Efficiency, and Cost of Synthetic Fuel Production Using Electrochemical CO2 Conversion and the Fischer-Tropsch Process. Energy Fuels. Jun. 1, 2016 ;30(7):5980-9."
Licht et al.,, "STEP Cement: Solar Thermal Electrochemical Production of Cao without CO2 emission. Chem. Commun. 2012;48:6019-6021. doi: 10.1039/c2cc31341c."
Liu et al.,, "Experimental study on improving cement quality with oxygen enriched combustion technology. IOP Conf. Series: Materials Science and Engineering. 2015;103:1-7."
Madrid et al.,, "Synthesis and morphological examination of high-purity Ca(OH)2 nanoparticles suitable to consolidate porous surfaces. Applied Surface Science. 2017;424:2-8. Epub Mar. 27, 2017."
Marin et al.,, "Simulating the Impact of Oxygen Enrichment in a Cement Rotary Kiln Using Advanced Computational Methods. Combust. Sci. and Tech. 2001; 164:193-207."
Mascolo et al.,, "Influence of Polymorphism and Stabilizing Ions on the Strength of Alite. Journal of the American Ceramic Society—Discussion and Notes. Apr. 1973;56(4):222-3."

(56) References Cited

OTHER PUBLICATIONS

Mirghiasi et al.,, "(2014), "Preparation and characterization of Cao nanoparticles from Ca(OH)2 by direct thermal decomposition method," Journal of Industrial and Engineering Chemistry 20: 113-117."
Mitlitsky et al., "(1998). "Regenerative Fuel Cell Systems," Energy & Fuels 12:56-71."
Morf et al.,, "Precious metals and rare earth elements in municipal solid waste—sources and fate in a Swiss incineration plant. Waste Manag. Mar. 2013;33(3):634-44. Epub Oct. 22, 2012. Erratum in: Waste Manag. Jun. 2013;33(6):1573."
Moustafa, et al., "Studing the Mechanical Properties of Rigid Pavement: Reinforced with Single and Hybrid Fibers", Civil Engineering and Architecture 9(6) http:www.hrpub.org DOI: 10.13189/cea 2021.090620, 2012, 1877-1899.
International Search Report and Written Opinion issued for PCT/US24/60372 by European Patent Office on Mar. 11, 2025, 13 pages.
Ebailila, Mansour et al., "Sulfate soil stabilisation with binary blends of lime-silica fume and lime-ground granulated blast furnace slag," Transportation Geotechnics, vol. 37, Nov. 1, 2022, 8 pages.
G. Habert, S. A. Miller, V. M. John, J. L. Provis, A. Favier, A. Horvath and K. L. Scrivener, Environmental impacts and decarbonization strategies in the cement and concrete industries, Nat. Rev. Earth Environ. 2020, 1, 559-573.
M. Fante, F. R. C. Ribeiro, D. B. Nunes, R. C. E. Modolo, C. S. Kazmierczak, M. Mancio, F. M. W. Tognoli, A. R. G. de Azevedo, M. P. Kulakowski, Case Studies in Construction Materials, 2022, 17, e01300.
Dietrich, Matthias, Sika Services AG, Zurich, "Performance enhancer for Portland Limestone Cement (PLC)" https://www.sika.com/dam/dms/corporate/j/glo-performance-enhancer-for-portland-limestone-cement.pdf, Jun. 2016, 4 pages.
Stemmermann P., "Celitement®—A new sustainable hydraulic binder based on calcium hydrosilicates," Karlsruh Institute of Technology, Institute of Technology Chemistry, Karlsruhe Germany. https://celitement.de/wp-content/uploads/2020/07/2010-11-16_Celitement_a_new_sustainable_hydraulic_binder_based_on_calciumhydrosilicates.pdf and accessed on Aug. 21, 2025.
Stemmermann P. et al, "Celitement—as sustainble prospect for the cement industry," Cement International May 2010, vol. 8, 16 pages.
Garbev, K et al., "Hydration Behavior of Celitement : Kinetics, Phase Composition, Microstructure and Mechanical Properties," Karlsrule Institute of Technology, Institute of Technical Chemistry, Karlsruh, Germany. https://celitement.de/wp-content/uploads/2020/07/Hydration_behavior_of_Celitement.pdf accessed 2011.
Garbev, K. et al., "Preparation of a Novel Cementitious Material from Hydrothermally Synthesized C—S—H Phases," J. Am.Ceram. Soc. 97 [7] pp. 2298-2307, 2014, 10 pages.
Moller, H "Celitement—A novel cement based on hydraulic calcium hydrosilicates (hCHS)", https://celitement.de/wp-content/uploads/2023/04/2023_04_27_Description_Celitement_MOE.pdf Apr. 27, 2023, 6 pages.
Moller, H., "Cement Completely Reimagined" An interview with Dr. Hendrick Moeller, Managing Director of Celitement GmbH, https://celitement.de/wp-content/uploads/2021/06/Celitement-Interview-EN.pdf Apr. 2021, 2 pages.
The Influence of Moulding Moisture Content on the Engineering Properties of Aggregate-Lime-Natural Pozzolan Mixes, Oct. 2004, Dissertation, University of Pretoria, Pretor.
K. Robalo et al., "Enhanced Mechanical and Durability Performances of Low Cement Concrete With Natural Pozzolan Addition," Journal of Advanced Concrete Technology, May 2021, 18 pages.
Bioworld. (2016). "Safety Data Sheet, Calcium Chloride Dihydrate," retrieved from the internet on Mar. 6, 2024 from <https:// www.bio-world.com/site/accounts/masterfiles/M S DS/M S-40300016.pdf> 8 pages.
Mujumdar et al., Rotary Cement Kiln Simulator (RoCKS): Integrated modeling of pre-heater, calciner, kiln and clinker cooler. Chemical Engineering Science. 2007;62(9):2590-607. Epub Feb. 14, 2007.
Odler et al., Polymorphism and Hydration of Silicate Silicate Doped With ZnO. Journal of the American Ceramic Society. Jan. 1983;66(1):1-4.
Rau (2009). "Electrochemical CO2 capture and storage with hydrogen generation," Energy Procedia 1: 823-828.
Rau, "Electrochemical Splitting of Calcium Carbonate to Increase Solution Alkalinity: Implications for Mitigation of Carbon Dioxide and Ocean Acidity," Environ. Sci. Technol.; vol. 42; 2008; pp. 8935-8940.
Rau, CO2 Mitigation via Capture and Chemical Conversion in Seawater. Environ. Sci. Technol. 2011 ;45(3): 1088-1092.
Schmidt et al., Future cost and performance of water electrolysis: An expert elicitation study. International Journal of Hydrogen Energy. Nov. 22, 2017;42(52):30470-92.
Stevula et al., Hydration of Polymorphic Modification C3S. Cement and Concrete Research. 1981 ;11(2): 183-190.
Sutkovic. (2014). "Ionic Chemical Equations," retrieved from the internet on Mar. 6, 2024 from <https://www.ius.edu.ba/ common/2014SpringChemistryProblemSample1.pdf> 3 pages.
Syc et al., Metal recovery from incineration bottom ash: State-of-the-art and recent developments. J Hazard Mater. Jul. 5, 2020;393:1-17. Epub Feb. 29, 2020.
Topham et al., Carbon Dioxide. Ullmann's Encyclopedia of Industrial Chemistry. Wiley-VCH. May 2014:1-43.
Traynor et al., Dissolution of olivines from steel and copper slags in basic solution. Cement and Concrete Research. Jul. 2020;133:106065. Author manuscript provided. 33 pages.
Voldsund et al., Comparison of Technologies for CO2 Capture from Cement Production—Part 1: Technical Evaluation. Energies. Feb. 12, 2019;12:559. 33 pages.
Yao et al., Mobility of heavy metals and rare earth elements in incineration bottom ash through particle size reduction. Chemical Engineering Science. Oct. 18, 2014;18:214-220.
Zeman et al., The Reduced Emission Oxygen Kiln: A White Paper Report for the Cement Sustainability Initiative of the World Business Council on Sustainable Development. Lenfest Center for Sustainable Energy. Columbia University. New York, NY. Jul. 31, 2008. 77 pages.
Geology. Limestone [retrieved from the internet at May 2, 2024 from URL: https//geology.com/rocks/limestone.shtml> and wayback machine at ,URL:https://web.archive.org/web/20211015232211/https://geology.com/rocks/limestone.shtml>] (Year:2021).
Hamdy et al., Hydration and characteristics of metakaolin pozzolanic cement pastes. HBRC Journal (2018), vol. 14, issue 2, pp. 150-158.
Mansour et al., Sulfate soil stabilisation with binary blends of lime-silica fume and lime-ground granulated blast furnace slag.
Wu et al. "Effects of sodium sulfate on the hydration and properties of lime-based low carbon cementitious materials", Journal of Cleaner Production, v220, 2019, pp. 677-626. D01:10.1016/j.jclepro.2019.02.186. (Year: 2019).
Marcelino et al. (2016). Evaluation of pyrite and pyrrhotite in concretes. Revista Ibracon De Estruturas E Materials, 9(3), 484-493 . D010:10.1590/S1983-41952016000300009 (Year: 2016).
Kaid et al "Durability of concrete containing a natural pozzolan as defined by a performance-based approach", Construction and Building Materials 23. pp. 3457-2467. (Year: 2009).
Taylor, Cement chemistry, 2nd edition. 1997. Thomas Telford Publishing. London, UK. 470 pages.
Licht, "Co-Production of Cement and Carbon Nanotubes with a Carbon Negative Footprint," Journal of CO2 Utilization, Aug. 2016. Accessed online at on Jan. 14, 2019.
Menendez etal "Durability of Blended Cements Made with Reactive Aggregates", Materials 14, 2948, https://doi.org/10.3390/ma14112948 (Year: 2021).

* cited by examiner

500

| | Metakaolin | 50%/50% Metakaolin/Silica Fume | Silica Fume |
|---|---|---|---|
| | 0.48 Al:Si | 0.22 Al:Si | 0.02 Al:Si |
| 0% $CaSO_4$ Binder (solids w/w) | 510  | 520  | 530  |
| 8% $CaSO_4$ Binder (solids w/w) | 540  | 550  | 560  |
| 15% $CaSO_4$ Binder (solids w/w) | 570  | 580  | 590  |

COMPOSITIONS COMPRISING LIME AND POZZOLAN, AND ASSOCIATED SYSTEMS AND METHODS

CROSS-REFERENCE TO RELATED APPLICATION(S)

The present application claims the benefit of U.S. Provisional Patent Application No. 63/610,353, filed Dec. 14, 2023, the disclosure of which is incorporated herein by reference in its entirety.

TECHNICAL FIELD

This present disclosure relates to compositions comprising lime and pozzolan, and associated systems and methods. Particular embodiments of the present disclosure relate to compositions comprising lime and pozzolan without limestone, for mixture with high sulfate materials.

BACKGROUND

Conventional mine backfill solutions generally include a combination of cement and fly ash or slag which is used as a cement extender or supplementary cementitious material. However, using fly ash for mine backfill has certain disadvantages, including that significant amounts of fly ash are needed and that the unconfined compressive strength (UCS) achieved when using fly ash varies, e.g., depending on the quality of the fly ash. Typically, only granulated slags produced in blast furnaces from iron and steel production are useful for cementing applications and must be ground before use. Additionally, the availability of fly ash and slag is diminishing over time, in part because fly ash is produced as a by-product at coal facilities which are being decommissioned or turned down, and in part because blast furnaces critical for slag production are being replaced with alternative technologies, such as directly reduced iron ore and electric arc furnaces, due to issues associated with the environment and greenhouse gas emissions. The diminishing supply of fly ash and slag has caused its cost (e.g., relative to the cost of cement) to increase, making the economics for producing mine backfill with fly ash or slag unpredictable and less desirable. Moreover, sulfate attacks remain a persistent problem for producing reliable mine backfill from tailings containing sulfide minerals. Ground, granulated blast furnace slag (also known as GGBFS) is the primary binder conventionally used to ameliorate sulfate attacks in mine backfill. As such, a need exists to develop complete and/or partial alternatives to fly ash and slag and/or improved mine backfill solutions.

BRIEF DESCRIPTION OF THE DRAWINGS

Features, aspects, and advantages of the presently disclosed technology may be better understood with regard to the following drawings.

Figure 1:
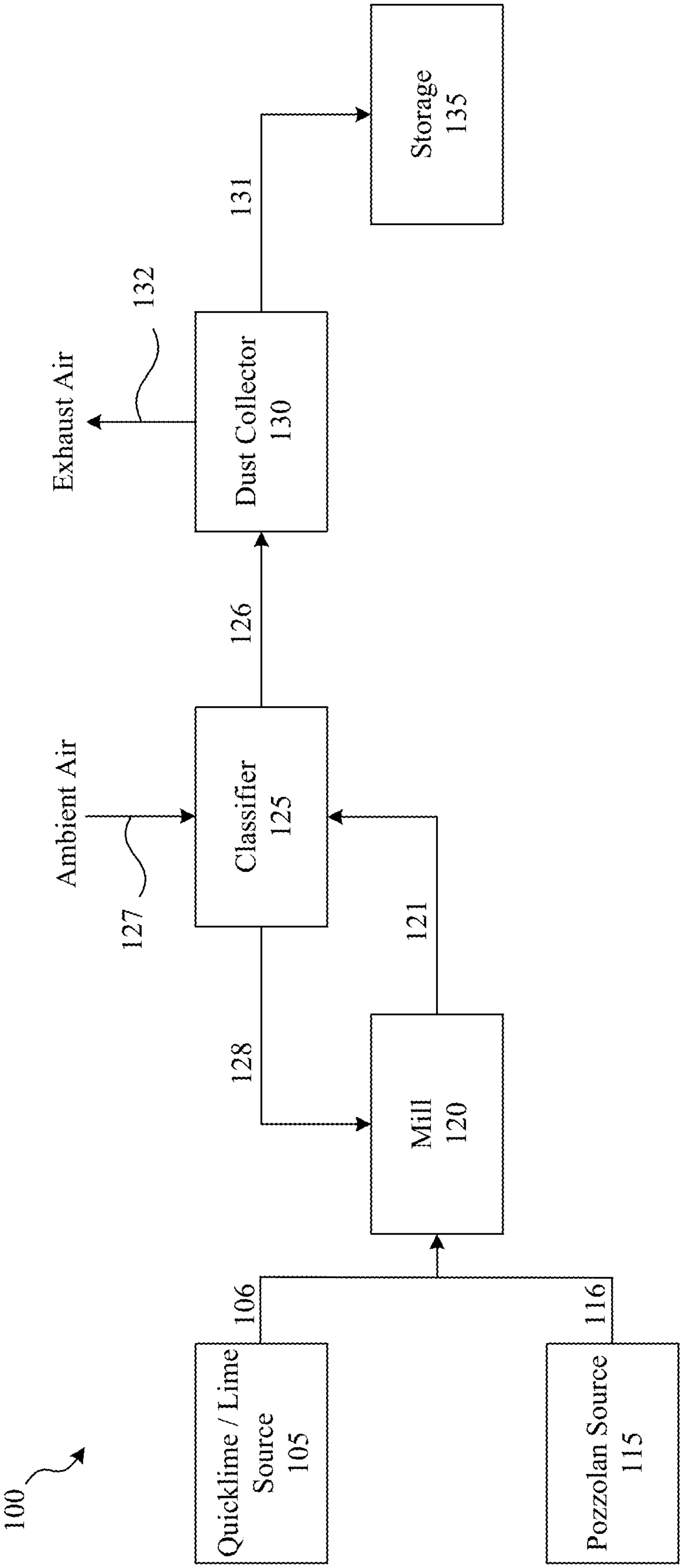
FIG. 1 is a schematic block diagram of a system for manufacturing lime-based cement extender or cement replacement compositions, in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present disclosure relate to combining lime with pozzolans to produce a composition that can be combined with or replace cement, e.g., for use as mine backfill and/or in the mining industry and soil stabilization. Embodiments of the present disclosure also relate to combining the composition of lime and pozzolans with aggregates (e.g., high-sulfate aggregates) to produce a formulation that can similarly be combined with or replace cement for use in the mining industry.

In many existing cement applications, the presence of sulfate is considered detrimental to the composition. For example, exposure to sulfate (e.g., in the environment) after hardening can result in sulfate attacks in which sulfate ions react with calcium to form calcium sulfate phases that can compromise the strength of the composition. For example, sulfate ions can react (i) with calcium hydroxide to form gypsum and/or (ii) with calcium aluminate hydrates to form ettringite. Gypsum and ettringite are both expansive calcium sulfate phases that may cause undesirable effects, including micro-fissures, cracking, and/or other deterioration of existing phases of the cement, such as calcium silicate hydrate (CSH) phases.

Also, as noted above, mine backfill solutions can generally include a combination of cement and fly ash or slag, which is used as a cement extender or supplementary cementitious material. However, because the availabilities of fly ash and slag are diminishing over time, significant amounts of fly ash and slag are needed, and the unconfined compressive strength (UCS) achieved when using fly ash and slag varies depending on the quality of the fly ash and slag, using fly ash and slag can cause difficulties.

Embodiments of the present disclosure address at least some of the above-described issues associated with sulfate attacks and/or with using fly ash or slag in combination with cement, e.g., for mine backfill applications, by producing a lime-based cement extender or replacement composition and/or a lime-based cement extender or replacement formulation that can effectively act as a substitute or alternative for, or a partial replacement of, fly ash or slag when combined with cement. As used herein, a cement blend (e.g., usable as mine backfill) can include a combination of cement (e.g., Portland cement) and a formulation configured in accordance with embodiments of the present technology. The formulation can include a combination of a product, aggregates, and/or admixtures. The product (also referred to as "lime-based cement extender or replacement composition," "supplementary cementitious material," or "composition") can include a combination of lime particles and pozzolan particles. The lime particles can include calcium oxide (CaO; quicklime) and/or calcium hydroxide ($Ca(OH)_2$; hydrated lime). The pozzolan particles can include silica and/or alumina. The aggregates can include soluble sulfate. The admixtures can include an accelerant, a water reducer, an activator, a superplasticizer, a synthetic polymer, and/or the like.

Embodiments of the present disclosure can address at least some of the above-described issues associated with sulfate attacks during critical periods in which mine backfill solutions are in use, by producing compositions and formulations with chemical makeup and/or admixtures that can accelerate, delay, or prevent the chemical reactions associated with sulfate attacks (e.g., formation of calcium sulfoaluminates and calcium sulfates) to avoid the negative impacts of sulfate attacks during such critical periods. For example, as described elsewhere herein, embodiments of the present disclosure can comprise a lime-based cement extender or replacement composition including 5-40% by weight lime particles and 60-95% by weight pozzolan particles. In particular, the pozzolan particles can include a relatively high alumina content, such as 10-100% by weight, to favor and accelerate the formation of calcium sulfoaluminates (e.g., ettringite) as opposed to, e.g., non-strength building calcium sulfate phases such as gypsum. In some embodiments, the accelerated formation of calcium sulfoaluminates (e.g., during the initial hydration of cement) can contribute to the early strength development and workability of the resulting cement blend (e.g., as mine backfill). The accelerated formation of calcium aluminum sulfates can also prevent or at least reduce the risk of formation of thaumasite—a calcium silicate mineral that can lead to significant loss of strength, disintegration, and widespread damage to the cement, particularly in cold climates—by using up most of the soluble sulfates present in aggregates. The term "early" or "accelerated," as used herein, can mean prior to 28 days following formation. In some embodiments, the compositions and formulations of the present technology do not include limestone (e.g., calcium carbonate) or include an amount of limestone below a predetermined threshold (e.g., 5%, 3%, or 1%, or 0.5%). Additionally or alternatively, the compositions and formulations can also include admixtures configured to accelerate or delay, depending on the desired effect, the formation of calcium aluminum sulfates by accelerating or delaying, respectively, the chemical reaction associated with sulfate attacks. The chemical reaction to be accelerated or delayed can include a reaction between soluble sulfate from the aggregates and the alumina from the pozzolans. In some aspects of the present technology, the compositions and formulations disclosed herein exhibit improved strength development by controlling the timing of the development of calcium aluminum sulfates. Moreover, compositions of the present technology can be used with particularly high-sulfate aggregates, which may be necessary or unavoidable in certain applications.

Additionally or alternatively, the lime-based cement extender or cement replacement composition can comprise a calcium oxide concentration of 4-50%, a magnesium oxide concentration of 0.1-15%, an iron oxide concentration of 0.5-2%, an aluminum oxide concentration of 5-40%, a silicon dioxide concentration of 0-65%, a potassium oxide concentration of 1,000-55,000 ppm, and a sodium oxide concentration of 500-35,000 ppm. Such concentrations can be determined based on an elemental analysis, e.g., in which an element of this composition is vaporized (e.g., via inductively coupled plasma (ICP)) and then analyzed by spectrometry (e.g., atomic emission spectroscopy (AES) or mass spectrometry). For example, the percent calcium oxide may be determined based on the elemental amount of calcium, the percent magnesium oxide may be determined based on the elemental amount of magnesium, and the percent iron oxide may be determined based on the elemental amount of iron. In some embodiments, the lime-based cement extender or cement replacement composition or formulation can be combined with cement to produce a cement blend for use in the mining industry as mine backfill. In some embodiments, the lime-based cement extender or cement replacement composition or formulation can replace cement for use in the mining industry as mine backfill.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Lime-Based Cement Extender or Cement Replacement Compositions, and Associated Systems and Methods FIG. 1 is a schematic block diagram of a system 100 for manufacturing lime-based cement extender or cement replacement compositions, in accordance with embodiments of the present technology. The system 100 can include a quicklime and/or lime source 105 ("lime source 105") and a pozzolan source 115. The lime source 105 can comprise quicklime (i.e., calcium oxide), dolomitic quicklime, lime (i.e., calcium hydroxide), hydrated lime, and/or enhanced lime (e.g., lime having a specific surface area greater than 35 $m^2/g$), and can have a particle size less than 0.375 inches. The quicklime can have a calcium content of at least 80%, 85%, 86%, 87%, 88%, 89%, 90%, 91%, 92%, 93%, 94%, or 95% by weight. The lime source 105 can provide available calcium and/or calcium hydroxide at a high pH (e.g., above 11.5 or 12.0) to the downstream mixture, that in part enables pozzolanic reactions to occur and strength gain for the downstream composition and/or end formulation.

The pozzolan source 115 can comprise a natural pozzolan, volcanic ash, zeolite, calcined clay, silicate, aluminate, silica flume, bauxite residue, mine waste, mine tailings, coal combustion waste residue, combustion waste residue, slag, metal or smelting residue, lithium processing residues, pozzolan slag, other clay materials (e.g., 1:1 clay such as kaolinite, 2:1 clay such as illite), hard rock pozzolans (e.g., spodumene), or a combination of two or more thereof (e.g., a blend of calcined clay and volcanic ash). In some embodiments, the pozzolan source 115 can comprise (i) at least 5%, 10%, 15%, 20%, 25%, 30%, 35%, 40%, 45%, 50%, 100%, 5-100%, or 5-50% by weight aluminum oxide, (ii) no more than 75%, 65%, 60%, 55%, 50%, 45%, 40%, 35%, 30%, 25%, 20%, 15%, 10%, 5%, 0%, 0-75%, or 30-75% by weight silicon dioxide, (iii) at least 2,000 ppm, 10,000 ppm, 50,000 ppm, 52,000 ppm, 54,000 ppm, 56,000 ppm, 58,000 ppm, or 2,000-58,000 ppm potassium dioxide, and (iv) at least 500 ppm, 10,000 ppm, 30,000 ppm, 32,000 ppm, 34,000 ppm, 36,000 ppm, 38,000 ppm, or 500-38,000 ppm sodium dioxide, e.g., as determined by elemental analysis from ICP methods. In some embodiments, the pozzolan source 115 has an alumina to silica ratio (by weight) of at least 0.01:1, 0.1:1, 0.15:1, 0.2:1, 0.3:1, 0.4:1, 0.6:1, 0.8:1, 1:1, 2:1, 3:1, 4:1, 5:1, 10:1, between 0.01:1 and 10:1, between 0.2:1 and 0.7:1, or more. The alumina to silica ratio can be based at least in part on the desired end product properties and/or cost of materials. For example, a high alumina content can favor the formation of ettringite over the formation of thaumasite, the former being preferred to the latter for reasons discussed herein. However, alumina is generally more expensive than silica, so a cost-benefit analysis can be performed to determine the appropriate silica to alumina ratio. In some embodiments, the pozzolan source 115 does not include silicon dioxide (e.g., the pozzolan source 115 includes pure alumina powder). In some embodiments, the pozzolan source 115 does not include aluminum oxide (e.g., the pozzolan source 115 includes silica fume). Table 1 below provides a list of example pozzolan materials and, for each, the alumina and silica contents (as % weight) and the alumina:silica ratio.

TABLE 1

| Material | % $Al_2O_3$ | % $SiO_2$ | Alumina:Silica Ratio |
|---|---|---|---|
| Ground Granulated Blast Furnace Slag | 10 | 36 | 0.28:1 |
| Class F Fly Ash | 16.2 | 59.7 | 0.27:1 |
| Silica Fume | 0.4 | 90 | 0.00 |
| Hard Rock Natural Pozzolan | 15.4 | 59.9 | 0.26:1 |
| Hard Rock Natural Pozzolan | 13.6 | 70.0 | 0.19:1 |
| Hard Rock Natural Pozzolan | 12.9 | 73.3 | 0.18:1 |
| Hard Rock Natural Pozzolan | 12.8 | 73.8 | 0.17:1 |
| Volcanic Ash Natural Pozzolan | 14.8 | 66.4 | 0.22:1 |
| Volcanic Ash Natural Pozzolan | 13.1 | 70.4 | 0.19:1 |
| Volcanic Ash Natural Pozzolan | 12.4 | 64.4 | 0.19:1 |
| Volcanic Ash Natural Pozzolan | 15.2 | 69.3 | 0.22:1 |
| Volcanic Ash Natural Pozzolan | 10.4 | 72.8 | 0.14:1 |
| Volcanic Ash Natural Pozzolan | 13.7 | 69.0 | 0.20:1 |
| Volcanic Ash Natural Pozzolan | 12.3 | 71.6 | 0.17:1 |
| Volcanic Ash Natural Pozzolan | 11.2 | 72.1 | 0.16:1 |
| Calcined Clay Pozzolan | 33.1 | 52.3 | 0.63:1 |
| Calcined Clay Pozzolan | 30.0 | 62.8 | 0.48:1 |
| Lithium Processing Waste | 25.0 | 68.2 | 0.37:1 |
| Lithium Processing Waste | 23.3 | 69.4 | 0.34:1 |
| Glass Waste | 1.7 | 72.8 | 0.02:1 |

The pozzolan source 115 can act as the silicate and/or aluminate source for the downstream composition and/or end formulation, and in part enables the downstream composition and/or end formulation to build strength via pozzolanic reactions and/or other reactions. The term "pozzolanic reactions" as used herein can refer to reactions that form calcium aluminate hydrates (CAH) and/or calcium silicate hydrates (CSH). Other reactions can form, e.g., calcium sulfoaluminates (CSA). In some embodiments, the formation of CAH and/or CSA, as opposed to CSH, can be favored in water surplus systems, such as hydraulically transported backfill (e.g., paste and hydraulic sandfill) and wet soils. CAH and CSA typically have higher water uptake than CSH (e.g., 6 or more molecules of water per unit of CAH, about 32 molecules of water per unit of CSA, and about 4 molecules of water per unit of CSH), so having a cementing phase with higher water uptake can remove more water from such water surplus systems, leading to an increase in solids content and strength.

Table 2 below provides example approximate chemical compositions for natural pozzolan and lithium residue, e.g., as determined by elemental analysis from ICP methods.

TABLE 2

| | Chemical Composition | | | | | | |
|---|---|---|---|---|---|---|---|
| | Ca (%) | Mg (%) | Fe (%) | Al (%) | Si (%) | K (ppm) | Na (ppm) |
| Natural Pozzolan | 0.9 | 0.2 | 1.8 | 10.3 | 65.8 | 56983 | 36361 |
| Lithium Residue | 0.1 | 0.1 | 0.9 | 25.0 | 68.2 | 3800 | 1610 |

The system 100 can include a plurality of weighing devices configured to weigh each of the lime source 105 and pozzolan source 115 ("feed components"), and a plurality of respective conveyer belts 106, 116 configured to convey the feed components to a milling and/or blending unit 120 ("mill 120"). The mill 120 can be a ball mill (e.g., a horizontal ball mill) configured to mechanically grind and blend the feed components to produce a milled blend. Mechanically grinding the feed components via the mill 120 can cause the feed components to be simultaneously hydrated and dried. For example, the residual moisture of the feed components (e.g., pozzolan) can chemically convert the quicklime to calcium hydroxide via Reaction 1.

$$CaO+H_2O \rightarrow Ca(OH)_2+Heat \quad \text{(Reaction 1)}$$

The heat produced via Reaction 1, and in some embodiments the heat of friction from the mechanical grinding action of the ball mill, reduces the residual moisture of the feed components. For example, the moisture content of the milled blend exiting the mill 120 can be less than 8%, 7%, 6%, 5%, 4%, 3%, or 2% by weight. As such, the system 100 is able to reduce the moisture content of the feed components with just the mill 120, and without additional equipment (e.g., a rotary dryer, burners, etc.) that increase capital and operating costs and generate combustion and other greenhouse gases that complicate environmental permitting. Doing so improves the economics of producing lime-based cement extender or cement replacement compositions, e.g., relative to fly ash.

The milled blend can comprise (i) at least 5%, 10%, 15%, 20%, 25%, 30%, 35%, 40%, 50% or 5-50% by weight quicklime and (ii) at least 50, 60%, 65%, 70%, 75%, 80%, 85%, 90%, 95% or 50-95% by weight pozzolans. In some embodiments, the milled blend comprises only lime (or quicklime) and pozzolans. The amount of quicklime can be on the lower side (e.g., 5%, 10%) when the resulting composition or formulation is to be used as a cement extender. The amount of quicklime can be on the higher side (e.g., 30%, 40%) when the resulting composition or formulation is to be used as a cement replacement. In some embodiments, the milled blend does not include limestone for reasons discussed in further detail herein. Additionally or alternatively, the milled blend can comprise (i) a calcium oxide concentration of 4-50%, (ii) a magnesium oxide concentration of 0.1-15%, (iii) an iron oxide concentration of 0.5-2%, (iv) an aluminum oxide concentration of 5-40%, (v) a silicon dioxide concentration of 0-65%, (vi) a potassium oxide concentration of 1,000-55,000 ppm, and (vii) a sodium oxide concentration of 500-35,000 ppm, e.g., as determined by elemental analysis from ICP methods. The amount of calcium oxide or calcium hydroxide of the milled blend that is available to react as part of the pozzolan reactions can be at least 5% by weight, no more than 50% by weight, or 5-50% by weight. The amount of available calcium oxide or calcium hydroxide was determined based on ASTM C 25-19: "Standard Test Methods for Chemical Analysis of limestone, quicklime, and hydrated lime."

The system 100 can further comprise an air separation and classification unit 125 ("classifier 125") configured to receive an ambient air stream 127 and produce a composition (e.g., a mine backfill composition). The classifier 125 can comprise an inlet 121, an outlet 126, and a return line 128 extending from the classifier 125 to the mill 120. The inlet 121 of the classifier 125 can comprise or be coupled to one or more screw conveyors and bucket elevators configured to transfer the milled blend from the mill 120 to the classifier 125. The classifier 125 can include a mechanical air swept separator sized such that at least 90%, 95%, or 99% of the particles are configured to pass 200 mesh and/or have a particle size no more than 75 microns. Such a particle size, relative to large particles, increases the surface area to volume ratio and enables the product to react quickly (or relatively quicker). Additionally, by reducing the particle size to pass 200 mesh and/or be no more than 75 microns, the particle size distribution is more uniform, thereby inhibiting the likelihood of segregation during transport, and the particle size is more similar to that of cement, thereby enabling better mixing and inhibiting segregation. Particles that do not pass through the separator will impact a rotating mechanical member of the separator and be returned to the mill 120, e.g., via the return line 128 (e.g., a chute) or other means, for further milling and size reduction. After further milling, these particles can be re-directed to the classifier 125 via the one or more screw conveyors and bucket elevators and/or inlet 121.

The system 100 can further comprise a dust collector 130 (e.g., a baghouse) downstream of the classifier 125, and storage 135 downstream of the dust collector 130. The particles that have a suitable particle size and pass through the separator of the classifier 125 are directed to the dust collector 130. The dust collector 130 emits an exhaust air stream 132 and is configured to remove dust and other fines prior to the composition being directed, e.g., via conveyors and/or elevators 131 to the storage 135 (e.g., product silos) for distribution to customers.

The composition (e.g., mine backfill composition) sent to the storage 135 can comprise particles for which at least 90%, 95%, or 99% passes 200 mesh and/or has a particle size no more than 75 microns. Additionally, the composition can have a makeup similar or identical to that of the milled blend. For example, the composition can comprise (i) at least 5%, 10%, 15%, 20%, 25%, 30%, 35%, 40%, 50, or 5-50% by weight quicklime and (ii) at least 50, 60%, 65%, 70%, 75%, 80%, 85%, 90%, 95% or 50-95% by weight pozzolans. In some embodiments, the composition does not include limestone for reasons discussed in further detail herein. Additionally or alternatively, the composition can comprise (i) a calcium oxide concentration of 4-50%, (ii) a magnesium oxide concentration of 0.1-15%, (iii) an iron oxide concentration of 0.5-2%, (iv) an aluminum oxide concentration of 5-40%, (v) a silicon dioxide concentration of 0-65%, (vi) a potassium oxide concentration of 1,000-55,000 ppm, and (vii) a sodium oxide concentration of 500-35,000 ppm, e.g., as determined by elemental analysis from ICP methods. Table 3 below provides example approximate chemical compositions for the composition when having a relatively high pozzolan ratio (e.g., 95% by weight pozzolan and 5% by weight lime) and a relatively low pozzolan ratio (e.g., 60% by weight pozzolan, 40% by weight lime), e.g., as determined by elemental analysis from ICP methods.

TABLE 3

| | Chemical Composition | | | | | | |
|---|---|---|---|---|---|---|---|
| | Ca (%) | Mg (%) | Fe (%) | Al (%) | Si (%) | K (ppm) | Na (ppm) |
| High Pozzolan | 38.3 | 1.0 | 1.7 | 23.8 | 64.9 | 54192 | 34545 |
| Low Pozzolan | 4.8 | 0.2 | 0.6 | 6.3 | 40.3 | 2742 | 984 |

Figure 2:
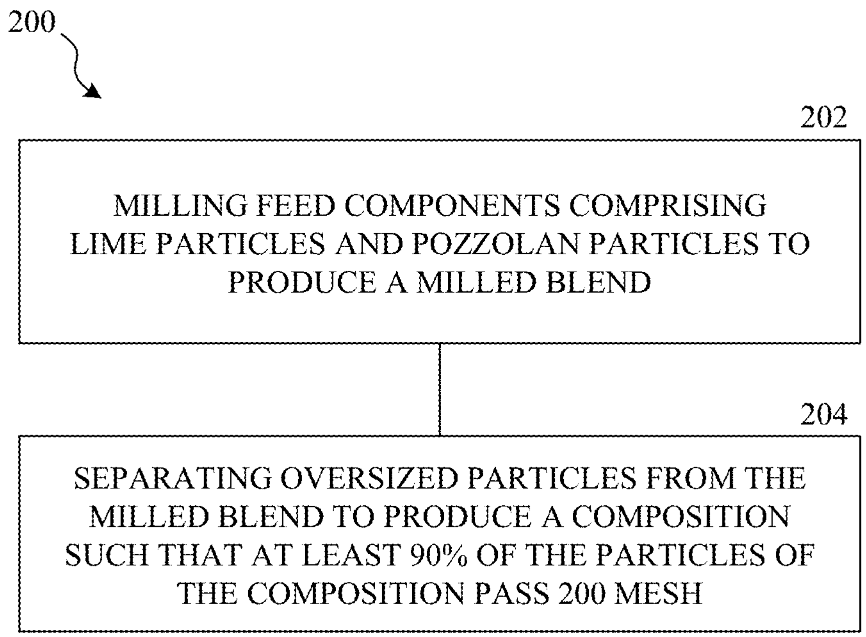
FIG. 2 is a flow diagram of a method for producing lime-based cement extender or cement replacement compositions, in accordance with embodiments of the present technology.

FIG. 2 is a flow diagram of a method 200 for producing lime-based cement extender or cement replacement compositions, in accordance with embodiments of the present technology. The method 200 includes milling feed components comprising lime particles (e.g., the lime source 105; FIG. 1) and pozzolan particles (e.g., the pozzolan source 115; FIG. 1) (process portion 202) to produce a milled product. Each of the lime particles and pozzolan particles can originate from respective lime and pozzolan sources, and be weighed and conveyed via conveyor belts for milling. Milling the feed components can be done in a horizontal ball mill and can produce a milled blend comprising (i) at least 5%, 10%, 15%, 20%, 25%, 30%, 35%, 40%, or 5-40% by weight quicklime and (ii) at least 60%, 65%, 70%, 75%, 80%, 85%, 90%, 95% or 60-95% by weight pozzolans. Additionally or alternatively, the milled blend can comprise a calcium oxide concentration of 45-65%, a magnesium oxide concentration of 0.5-2%, an iron oxide concentration of 0.5-2.0%, an aluminum oxide concentration of 2-8%, a silicon dioxide concentration of 20-40%, a potassium oxide concentration of 20,000-30,000 ppm, and a sodium oxide concentration of 10,000-20,000 ppm, e.g., as determined by elemental analysis from inductively-coupled plasma methods. Milling (e.g., grinding) the feed components can also simultaneously blend the individual feed components to form a uniform blend, as well as dry the feed components to reduce their residual moisture content. Without being bound by theory, the heat for drying the feed components may originate from the heat of friction from the mechanical grinding action of the ball mill. Additionally or alternatively, the moisture content can also be reduced via the interaction of quicklime of the lime particles and residual moisture present within the ball mill, which react with one another (via Reaction 1) to form calcium hydroxide and heat.

The method 200 further includes separating oversized particles from the milled blend to produce a product (e.g., the product or lime-based cement extender or cement replacement composition referred to elsewhere herein), such that at least 90%, 95%, 97%, or 99% of the particles of the product pass 200 mesh (process portion 204). Stated differently, at least 90% of the particles of the product have a particle size no greater than 75 microns. Separation of the oversized particles can occur via an air classifier (e.g., the classifier 125), in which oversized particles are directed back to the mill (e.g., via a chute or return line) for further grinding and size reduction, and the remaining particles are directed to an outlet of the classifier. Structures other than air classifiers, such as screen decks, can also be used to separate oversized particles. The oversized particles directed back to the mill are eventually returned to the classifier (e.g., via a plurality of conveyors and bucket loaders). The remaining particles (e.g., the particles passing 200 mesh) can be directed to a dust collector, and subsequently to storage (e.g., product silos) as product for distribution to customers.

Figure 3A:
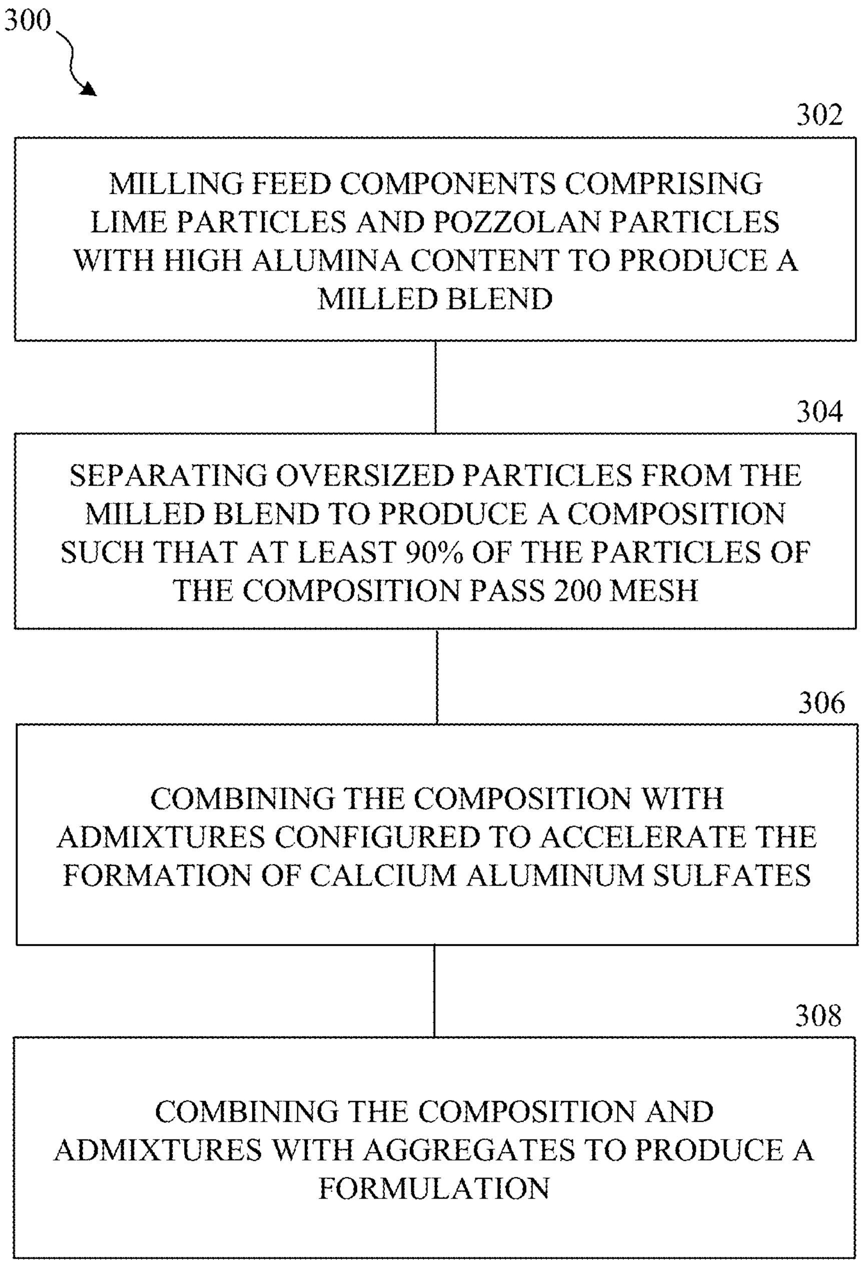
FIG. 3A is a flow diagram of a method for producing formulations that accelerate a chemical reaction associated with sulfate attacks, in accordance with embodiments of the present technology.
Figure 3B:
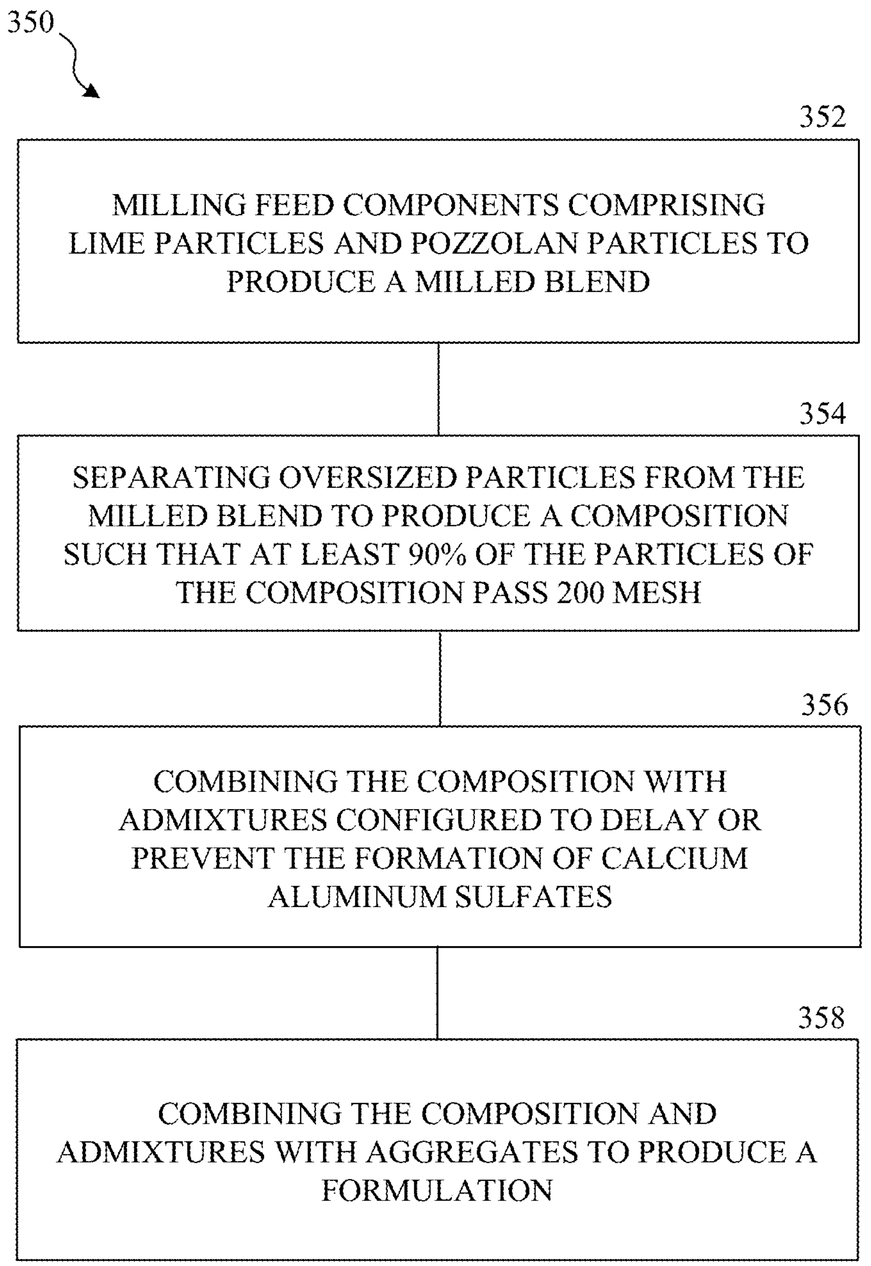
FIG. 3B is a flow diagram of a method for producing formulations that delay a chemical reaction associated with sulfate attacks, in accordance with embodiments of the present technology.

FIGS. 3A and 3B are flow diagrams of methods for producing formulations including the compositions described herein. In particular, the methods allow accelerating or delaying certain chemical reaction to avoid sulfate attacks during critical periods, such as during the cementitious process of the composition or formulation. Sulfate attacks are chemical reactions between soluble sulfate (e.g., in aggregates) and at least one of calcium from lime or alumina from pozzolans that produce calcium aluminum sulfate and/or calcium sulfate minerals, such as ettringite and gypsum. These compounds are typically slow to form and undergo volumetric expansion (e.g., upon absorbing water), resulting in undesirable cracking, fracturing, and loss of mass that are harmful to strength development of the formulation. Therefore, as described herein, it can be advantageous to accelerate the chemical reaction such that it occurs prior to the critical periods, or delay (or prevent entirely) the chemical reaction such that it occurs after the critical periods.

Referring first to FIG. 3A, FIG. 3A illustrates a method 300 for producing a formulation that accelerates the chemical reaction associated with sulfate attacks. The method 300 can include milling, via a mill, feed components comprising lime particles and pozzolan particles with high alumina content to produce a milled blend (process portion 302). The milled blend can comprise (i) at least 5% by weight of the lime particles, and (ii) at least 50% by weight of the pozzolan particles. In some embodiments, the pozzolan particles comprise (i) at most 75%, 70%, 65%, 60%, 55%, 50%, or 50-75% by weight silica ($SiO_2$) and (ii) at least 15%, 20%, 25%, 30%, 35%, 40% 45%, or 15-45% by weight alumina ($Al_2O_3$). For example, the pozzolan particles can comprise about 64% by weight silica and about 24% by weight alumina. As discussed above with respect to FIG. 1, pozzolans that can provide relatively high alumina content include clay materials (e.g., 1:1 clay such as kaolinite, 2:1 clay such as illite), lithium residues, and hard rock pozzolans (e.g., feldspar). The relatively high alumina content can help accelerate the chemical reaction between the alumina and the soluble sulfate downstream.

The method 300 can also include separating oversized particles from the milled blend to produce a composition (e.g., the lime-based cement extender or cement replacement composition referred to elsewhere herein), such that at least 90%, 95%, 97%, or 99% of the particles of the product pass 200 mesh (process portion 304). Stated differently, at least 90% of the particles of the composition have a particle size no greater than 75 microns. Separation of the oversized particles can occur via an air classifier (e.g., the classifier 125), in which oversized particles are directed back to the mill (e.g., via a chute or return line) for further grinding and size reduction, and the remaining particles are directed to an outlet of the classifier. Structures other than air classifiers, such as screen decks, can also be used to separate oversized particles. The oversized particles directed back to the mill are eventually returned to the classifier (e.g., via a plurality of conveyors and bucket loaders). The remaining particles (e.g., the particles passing 200 mesh) can be directed to a dust collector, and subsequently to storage (e.g., product silos) as product for distribution to customers.

As discussed elsewhere herein, the composition can have an identical or similar makeup as the milled blend. For example, the composition can comprise (i) at least 5%, 10%, 15%, 20%, 25%, 30%, 35%, 40%, 45%, 50% or 5-50% by weight quicklime and (ii) at least 50%, 55%, 60%, 65%, 70%, 75%, 80%, 85%, 90%, 95% or 50-95% by weight pozzolans. The pozzolans can comprise (i) at most 75%, 70%, 65%, 60%, 55%, 50%, or 50-75% by weight silica ($SiO_2$) and (ii) at least 15%, 20%, 25%, 30%, 35%, 40%, 45% or 15-45% by weight alumina ($Al_2O_3$).

The method 300 can further include combining the composition with admixtures configured to accelerate the chemical reaction downstream and thus accelerate the formation of calcium aluminum sulfates and/or calcium sulfate minerals (process portion 306). The admixtures can comprise an accelerant, a water reducer, an activator, a superplasticizer and/or a synthetic polymer. The aggregates can be configured to promote, delay, or otherwise control reactions between the lime particles and the pozzolan particles, for example, to speed up the hardening of the cement, increase workability of the cement, and/or modify other properties of the cement. Embodiments of the present technology can enable the production of improved lime-based formulations that have a lower greenhouse gas and carbon footprint, e.g., by replacing in whole or in part the effect of fast setting phases in hydraulic cements (e.g., alite) with admixtures, while also having sufficient strength (e.g., unconfined compressive strength). The admixtures of the present technology can be introduced act as a catalyst to influence the sequence and accelerate the kinetics of chemical reactions between the pozzolan and lime, and thereby enable the accelerated formation of calcium silicate hydrates and calcium aluminate hydrates that are responsible for strength gain in the end product (e.g., mine backfill product). Additionally, the admixtures of the present technology can be introduced act as a catalyst to influence the sequence and accelerate the kinetics of chemical reactions between lime, pozzolan, and sulfate, and thereby enable the accelerate formation of calcium aluminum sulfates (e.g., ettringite) such that these phases can contribute to early strength gain. In doing so, the greenhouse gas footprint associated with production of calcium silicate hydrate and calcium aluminate hydrate phases using the present technology that utilizes admixtures are significantly lower (e.g., at least 10%, 20%, or 30% lower) compared to 'alite' and 'belite' in traditional clinker production, e.g., due to the avoidance of energy associated with the calcination of raw materials to produce clinker. As such, embodiments of the present technology enable production of compositions that have equivalent or improved strength to traditional cement products, while also having a lower greenhouse gas and carbon footprint.

The method 300 can then include combining the composition and the admixtures with aggregates to produce a formulation (process portion 308). The aggregates can include mine tailings (e.g., paste tailing), mine wastes (e.g., waste rock), soils, etc. with a high sulfate content. For example, in some embodiments, the aggregates can comprise (i) at least 2,000 ppm, 3,000 ppm, 4,000 ppm, 5,000 ppm, 6,000 ppm, 7,000 ppm, 8,000 ppm, 9,000 ppm, 10,000 ppm, 20,000 ppm, or 2,000-20,000 ppm of soluble sulfate, and/or (ii) at least 2%, 5%, 10%, 15%, or 2-15% by weight total sulfur. In some embodiments, the aggregates comprise sodium sulfate, calcium sulfate (gypsum), magnesium sulfate, potassium sulfate, iron sulfate, ammonium sulfate, and/or the like. As discussed above, the soluble sulfate can be responsible for sulfate attacks, and therefore are of particular concern. However, the total sulfur content of the aggregates can also be of concern. For example, the aggregates can comprise iron sulfides (e.g., pyrite), which may undergo oxidation and produce additional soluble sulfate.

In some embodiments, the high alumina content of the pozzolans and/or the admixtures accelerate the chemical reaction such that the soluble sulfate from the aggregates reacts early on and there is only a negligible amount of sulfate left to cause a sulfate attack (e.g., formation of thaumasite) during the period in which the formulation is in use. For example, the formulation produced by the method 300 can accelerate the chemical reaction such that at least 50, 60, 70%, 80%, 90%, 95%, 99%, or 50-99% of the soluble sulfate is used up within 1 day, 2 days, 3 days, 4 days, 5 days, 6 days, 7 days, 10 days, 14 days or 28 days. In another example, the formulation produced by the method 300 can accelerate the chemical reaction such that the concentration of soluble sulfate becomes no more than 2,000 ppm, 1,000 ppm, 500 ppm, or 500-2,000 ppm within 1 day, 2 days, 3 days, 4 days, 5 days, 6 days, 7 days, 10 days, 14 days or 28 days.

As noted above, in some embodiments, the composition, and thus the resulting formulation, do not include limestone (e.g., calcium carbonate), especially from natural sources. Limestone is relatively insoluble so the calcium of limestone can take longer to react (e.g., relative to calcium of lime) with soluble sulfate from the aggregates to produce calcium aluminum sulfate and/or calcium sulfate minerals. For example, limestone can take at least 7 days, 10 days, 14 days, or longer to react. Therefore, in order to accelerate the chemical reaction that produces compounds such as ettringite and thereby avoid sulfate attacks during critical time periods, it can be advantageous to omit limestone when producing the composition and/or formulation. In particular, because carbonates are a component of thaumasite, the omission of limestone can deter the formation of thaumasite, thereby preventing or at least reducing the risk of the significant strength loss and damage associated therewith. In some embodiments, the composition and/or the formulation may still include limestone, such as specifically manufactured calcium carbonates that have unique structures either limiting or preventing sulfate attacks.

Referring next to FIG. 3B, FIG. 3B illustrates a method 350 for producing a formulation that delays or prevents the chemical reaction associated with sulfate attacks. The method 350 can include milling, via a mill, feed components comprising lime particles and pozzolan particles with high alumina content to produce a milled blend (process portion 352). The milled blend can comprise (i) at least 5% by weight of the lime particles, and (ii) at least 50% by weight of the pozzolan particles.

The method 350 can also include separating oversized particles from the milled blend to produce a composition (e.g., the lime-based cement extender or cement replacement composition referred to elsewhere herein), such that at least 90%, 95%, 97%, or 99% of the particles of the product pass 200 mesh (process portion 354). Stated differently, at least 90% of the particles of the composition have a particle size no greater than 75 microns. Separation of the oversized particles can occur via an air classifier (e.g., the classifier 125), in which oversized particles are directed back to the mill (e.g., via a chute or return line) for further grinding and size reduction, and the remaining particles are directed to an outlet of the classifier. Structures other than air classifiers, such as screen decks, can also be used to separate oversized particles. The oversized particles directed back to the mill are eventually returned to the classifier (e.g., via a plurality of conveyors and bucket loaders). The remaining particles (e.g., the particles passing 200 mesh) can be directed to a dust collector, and subsequently to storage (e.g., product silos) as product for distribution to customers.

As discussed elsewhere herein, the composition can have an identical or similar makeup as the milled blend. For example, the composition can comprise (i) at least 5%, 10%, 15%, 20%, 25%, 30%, 35%, 40%, 45%, 50% or 5-50% by weight quicklime and (ii) at least 50%, 55%, 60%, 65%, 70%, 75%, 80%, 85%, 90%, 95% or 60-95% by weight pozzolans.

The method 350 can further include combining the composition with admixtures configured to delay or prevent the chemical reaction downstream and thus delay or prevent the formation of calcium aluminum sulfates and/or calcium sulfate minerals (process portion 356). The admixtures can comprise an accelerant, a water reducer, an activator, a superplasticizer and/or a synthetic polymer. The aggregates can be configured to promote, delay, or otherwise control reactions between the lime particles and the pozzolan particles, for example, to speed up the hardening of the cement, increase workability of the cement, and/or modify other properties of the cement. Embodiments of the present technology can enable the production of improved lime-based formulations that have a lower greenhouse gas and carbon footprint, e.g., by replacing in whole or in part the effect of alites in traditional cement with admixtures, while also having sufficient strength (e.g., unconfined compressive strength). The admixtures of the present technology can be introduced act as a catalyst to influence the sequence and accelerate the kinetics of chemical reactions between the pozzolan and lime, and thereby enable the accelerated formation of calcium silicate hydrates and calcium aluminate hydrates that are responsible for strength gain in the end product (e.g., mine backfill product). In doing so, the greenhouse gas footprint associated with production of calcium silicate hydrate and calcium aluminate hydrate phases using the present technology that utilizes admixtures are significantly lower (e.g., at least 10%, 20%, or 30% lower) compared to traditional clinker production, e.g., due to the avoidance of energy associated with the calcination of raw materials to produce clinker. As such, embodiments of the present technology enable production of compositions that have equivalent or improved strength to traditional cement products, while also having a lower greenhouse gas and carbon footprint.

The method 350 can then include combining the composition and the admixtures with aggregates to produce a formulation (process portion 358). The aggregates can include mine tailings and wastes (e.g., paste tailing), soils, etc. with a high sulfate content. For example, in some embodiments, the aggregates can comprise (i) at least 2,000 ppm, 3,000 ppm, 4,000 ppm, 5,000 ppm, 6,000 ppm, 7,000 ppm, 8,000 ppm, 9,000 ppm, 10,000 ppm, 20,000 ppm, or 2,000-20,000 ppm of soluble sulfate, and/or (ii) at least 2%, 5%, 10%, 15%, or 2-15% by weight total sulfur. As discussed above, the soluble sulfate can be responsible for sulfate attacks, and therefore are of particular concern. However, the total sulfur content of the aggregates can also be of concern. For example, the aggregates can comprise sulfide minerals, e.g., pyrite, which may undergo oxidation and produce additional soluble sulfate. Moreover, because the period in which the presence of the formulation is critical typically ranges from a year to a decade, the formulation only needs to delay the chemical reaction until after that period.

Referring to FIGS. 2-3B together, the methods 200, 300, and 350 can produce compositions and/or formulations that can be combined with cement, e.g., to be used in the mining industry as mine backfill. Doing so can effectively extend the use of cement, by maintaining or enhancing its utility while improving the economics associated with its use. The product can comprise 40%, 45%, 50%, or 55% of the blend, with cement comprising the balance. The cement blend can have a UCS that increases over time, e.g., from Days 7 to 28 after formulation. For example, the UCS of the product 7 days of being formed is at least 0.25 MPa, 0.5 MPa, 0.75 MPa, 1 MPa, 1.25 MPa, 2 MPa, or 3 MPa, and the unconfined compressive strength of the product 28 days of being formed is at least 0.5 MPa, 1 MPa, 1.5 MPa, 2 MPa, 2.5 MPa, 3 MPa, 4 MPa, or 5 MPa. Additionally or alternatively, the cement blend can over time have a higher UCS relative to cement alone. For example, the UCS of a cement blend comprising about 50% by weight of each of Portland Cement and product (i.e., quicklime and pozzolan), at Day 28, can be higher than that of Portland Cement on its own. Additionally, the UCS of a cement blend comprising about 50% by weight of each of Portland Cement and product (i.e., quicklime and pozzolan), at Day 28, can be higher than a blend of UCS of Portland Cement and one of quicklime or pozzolan. It is appreciated that cement blends in accordance with embodiments of the present technology can have various Portland Cement-to-product ratios, such as at least 50%, 60%, 70%, 80%, 90%, 50-90%, or more by weight) product (i.e., quicklime and pozzolan).

Embodiments of the present disclosure enable the production of compositions and formulations (e.g., mine backfill) by producing an effective substitute or alternative for, or a partial replacement of, fly ash or slag when combined with cement. For example, a cement blend in accordance with embodiments of the present technology can include about 20% Portland Cement, about 40% slag (e.g., ground granulated blast-furnace slag (GGBFS)), and about 40% product (i.e., quicklime and pozzolan). Other proportions are within the scope of the present technology. As such, embodiments of the present disclosure enable the production of improved compositions for mine backfill applications that do not include or include less of, compared to existing blends, fly ash or slag, and, additionally, are not or at least less affected by the diminishing supply and increased price of fly ash or slag. Additionally, the lime-based cement extender or cement replacement compositions and formulations of the present technology can form an improved product that uses relatively less material, last longer, and has a higher unconfined compressive strength, relative to mine backfill products that include fly ash or slag. Additionally, producing embodiments of the present technology can result in fewer greenhouse gas emissions and a smaller carbon footprint relative to that of fly ash, which is produced as a by-product of coal facilities, or slag which is produced as a byproduct of metal smelting and refining. Additionally, the lime-based cement extender or cement replacement compositions and formulations of the present technology can have greater strength during critical periods in which the compositions and formulations are in use by accelerating, delaying, or substantially preventing or inhibiting sulfate attacks.

III. Experimental Results

Figure 4A:
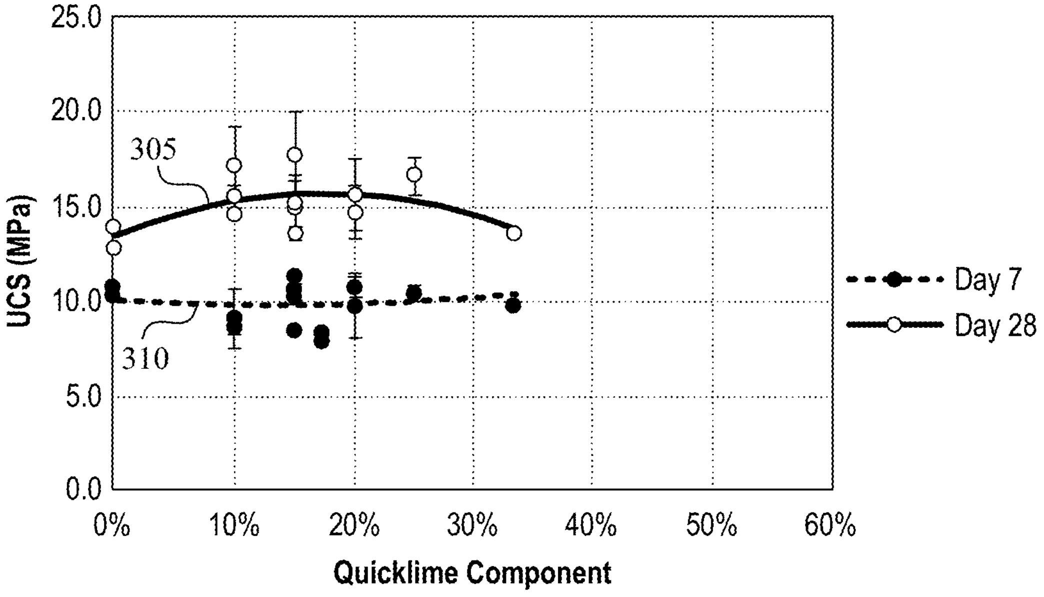
FIG. 4A illustrates the relationship between UCS and varying amounts of quicklime, in accordance with embodiments of the present technology.
Figure 4B:
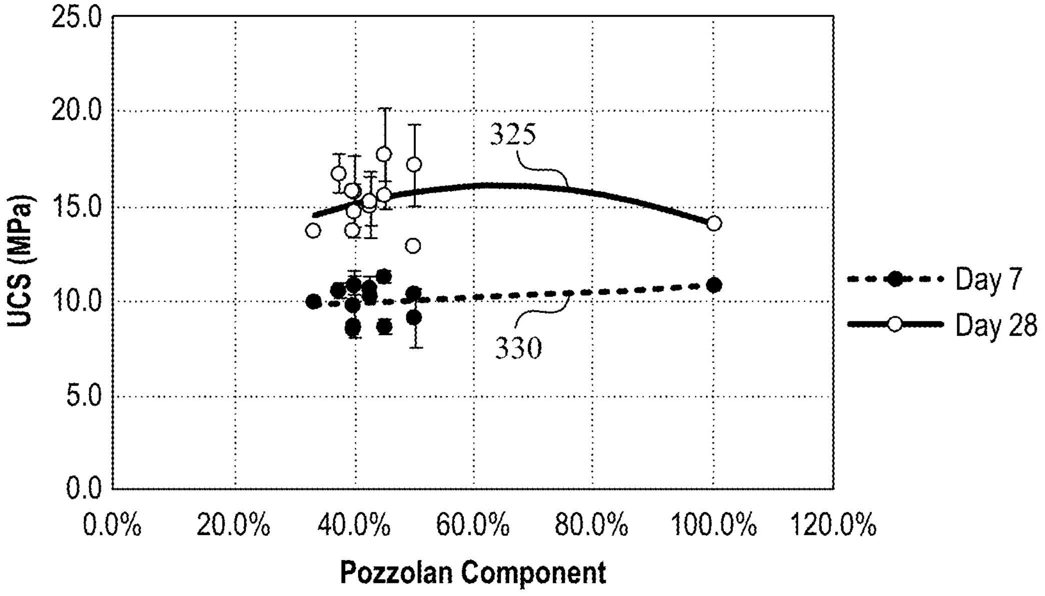
FIG. 4B illustrates the relationship between UCS and varying amounts of pozzolan, in accordance with embodiments of the present technology.

FIGS. 4A and 4B are plots illustrating the relationship between UCS (MPa) and varying amounts of individual components of a composition, in accordance with embodiments of the present technology. FIG. 4A illustrates the relationship between UCS and varying amounts of quicklime, and FIG. 4B illustrates the relationship between UCS and varying amounts of pozzolan. The composition used for each of the plots of FIGS. 4A and 4B includes 50% cement, and varying amounts of the individual components as shown in FIGS. 4A and 4B. As such, the percentages shown for each of the individual components in FIGS. 4A and 4B represents 50% of the composition. Moreover, for each of the plots, which shows varying amounts of one of the quicklime or pozzolan, the amount of the other components also varies. For example, for the plot of FIG. 4A which shows the amount of quicklime varying from 0% to about 34%, the amount of pozzolan also varies as the amount of quicklime increases.

With reference to FIGS. 4A and 4B together, the UCS exhibits a peak at various amounts for each of the individual components. For example, the UCS peak for quicklime occurs at about 17% (FIG. 4A), and the UCS peak for pozzolan occurs at about 65% (FIG. 4B). As such, in some embodiments an optimal strength for the overall product can occur when the product comprises about 45-55% cement, more pozzolan than lime, and no limestone.

Table 4 includes data corresponding to the amount of available CaO and pH for a type I/II cement ("Cement"), a lime-based cement extender or cement replacement product ("Product"), and a 1:1 mixture of the Cement and Product. The Product here can correspond to the product or lime-based cement extender or cement replacement composition described above with reference to FIGS. 1 and/or 2.

TABLE 4

| Material | % Available CaO | pH |
|---|---|---|
| Type I/II Cement ("Cement") | 15.7 | 12.1 |
| Lime Based Cement Extender ("Product") | 10.3 | 12.5 |
| 1:1 mixture of Cement and Product | 16.4 | 12.5 |

The percent available CaO shown in Table 4 was determined based on ASTM C 25-19: "Standard Test Methods for Chemical Analysis of Limestone, Quicklime, and Hydrated Lime". The pH was obtained by creating an about 5% slurry of the material in distilled water, and measuring the pH once the temperature stabilized at room temperature (about 22° C.) using a calibrated pH electrode.

As shown in Table 4, the lime supplies at least 10% available lime in the Product, which results in no reduction of available CaO in the blended mixtures. That is, the available lime of the Cement is about 15.7% and the available lime of the 1:1 mixture is about 16.4. Additionally, the lime maintains the pH above about 12.0, thereby enabling pozzolanic reactions to occur and/or continue, which develops UCS gains over time.

Table 5 provides chemical assay results of analyzing metakaolin and silica fume. Metakaolin is a highly reactive, alumina-enriched pozzolanic material derived from the calcination of kaolin clay. Metakaolin is also an amorphous aluminosilicate that can be used as a supplementary cementitious material (SCM) in concrete and other construction applications.

TABLE 5

| Sample | Metakaolin | Silica Fume |
|---|---|---|
| % CaO | 0.32 | 1.35 |
| % MgO | 0.43 | 1.05 |
| % Fe2O3 | 1.186 | 3.796 |
| % Al2O3 | 30 | 1.641 |
| % SiO2 | 62.8 | 80.5 |
| % MnO | 0.009 | 5.3898 |
| % SrO | 0.011 | 0.0152 |
| % BaO | 0.066 | 0.0293 |
| % K2O | 1.654 | 1.7248 |
| % Na2O | 0.147 | 0.1596 |
| % P2O5 | 0.031 | 0.01 |
| % TiO2 | 0.682 | 0.0373 |
| % Total | 97.34 | 95.7 |
| % Sulfur | 0.056 | 0.038 |
| % Carbon | 0.106 | 1.861 |
| % Carbon Dioxide | 0.39 | 6.82 |
| LOI (1000° C.) | 2.45 | 4.15 |

As shown above, Table 5 lists the loss on ignition (LOI) at 1000° C. and the chemical composition of metakaolin and silica fume, each including various percentages of calcium oxide, magnesium oxide, and other compounds. In particular, the particular metakaolin sample includes 30% alumina and 62.8% silica, and the particular silica fume sample includes 1.641% alumina and 80.5% silica. Therefore, as discussed further herein, metakaolin and silica fume can be used in various proportions to achieve various alumina:silica ratios.

TABLE 6

| ASTM C1897 | Bound Water Corr. | Bound Water 7-Day | 7-Day Bound Water Final |
|---|---|---|---|
| Metakaolin | 0.73% | 13.05% | 12.98% |
| Silica Fume | 1.84% | 7.27% | 7.09% |

Table 6 above provides the results of ASTM bound-water tests performed on metakaolin and silica fume. The bound-water content is a measure of the water that is chemically bound within the structure of the minerals formed after the potential pozzolans reacts with calcium hydroxide and water, e.g., through pozzolanic reactions. As shown, metakaolin has a higher bound-water content than silica fume at 7 days (e.g., almost twice as much), suggesting that metakaolin has a greater ability to retain water within its structure, which can be beneficial in concrete formation where water retention can influence the hydration process and overall strength development.

Figure 5:
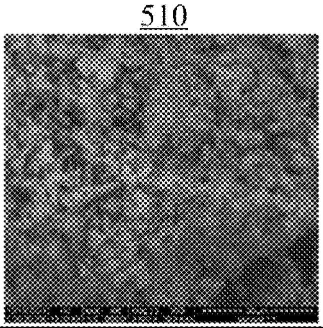
FIG. 5 illustrates a table with scanning electron microscopy (SEM) scans of various alumina-silica samples, in accordance with embodiments of the present technology.
Figure 5:
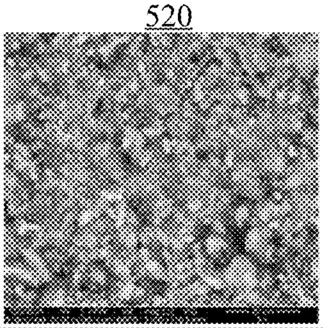
Figure 5:
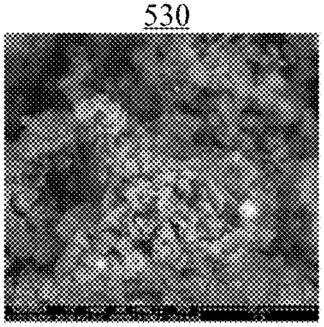
Figure 5:
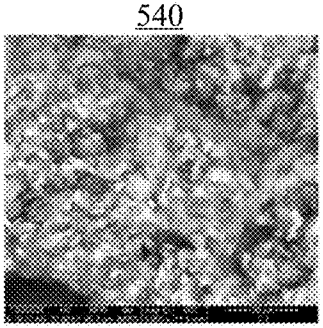
Figure 5:
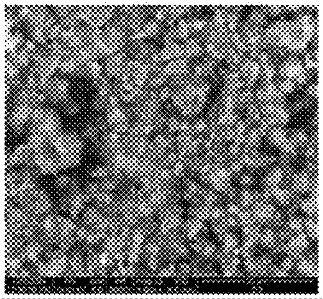
Figure 5:
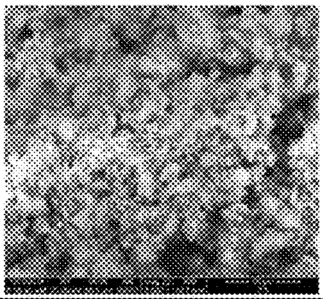
Figure 5:
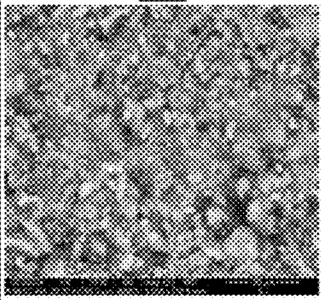
Figure 5:
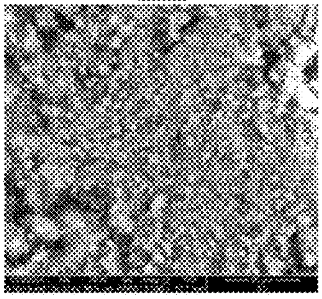
Figure 5:
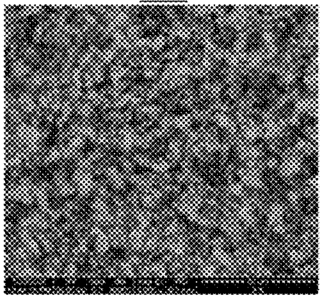

FIG. 5 illustrates a table 500 with scanning electron microscopy (SEM) scans of various alumina-silica samples. More specifically, different columns are associated with different Al:Si ratios, and different rows are associated with different calcium sulfate contents. For example, the first column includes SEM scans of samples of metakaolin having an Al:Si ratio of 0.48, the second column includes SEM scans of samples of a 50%/50% blend of metakaolin and silica fume having an Al:Si ratio of 0.22, and the third column includes SEM scans of samples of silica fume having an Al:Si ratio of 0.02. The first row includes SEM scans of samples having no calcium sulfates, the second row includes SEM scans of samples having about 8% calcium sulfates by solids w/w, and the third row includes SEM scans of samples having about 15% calcium sulfates by solids w/w. Accordingly, the table 500 includes SEM scans of samples 510, 520, 530, 540, 550, 560, 570, 580, 590 having various combinations of Al:Si ratios and calcium sulfate concentrations. Table 7 below provides the chemical compositions of each of the samples shown in FIG. 5, and Table 8 below provides the X-ray diffraction (XRD) analysis results (in wt %) of each of the samples shown in FIG. 5. Blanks in Table 8 indicate that no significant amounts of the corresponding mineral/phase was determined to be present in the sample.

TABLE 7

| Sample | Metakaolin (g) | Silica fume (g) | $Ca(OH)_2$ (g) | $CaCO_3$ (g) | $CaSO_4$ (g) | Water (g) | Al (g) | Si (g) | $CaSO_4$:Al ratio |
|---|---|---|---|---|---|---|---|---|---|
| 510 | 15 | 0 | 15 | 5 | 0 | 54 | 4.50 | 9.42 | 0.0 |
| 520 | 7.5 | 7.5 | 15 | 5 | 0 | 54 | 2.37 | 10.75 | 0.0 |
| 530 | 0 | 15 | 15 | 5 | 0 | 54 | 0.25 | 12.08 | 0.0 |
| 540 | 15 | 0 | 15 | 5 | 2.7 | 54 | 4.50 | 9.42 | 0.6 |
| 550 | 7.5 | 7.5 | 15 | 5 | 2.7 | 54 | 2.37 | 10.75 | 1.1 |
| 560 | 0 | 15 | 15 | 5 | 2.7 | 54 | 0.25 | 12.08 | 11.0 |
| 570 | 15 | 0 | 15 | 5 | 5.4 | 54 | 4.50 | 9.42 | 1.2 |
| 580 | 7.5 | 7.5 | 15 | 5 | 5.4 | 54 | 2.37 | 10.75 | 2.3 |
| 590 | 0 | 15 | 15 | 5 | 5.4 | 54 | 0.25 | 12.08 | 21.9 |

TABLE 8

| Mineral/Phase | 510 | 520 | 530 | 540 | 550 | 560 | 570 | 580 | 590 |
|---|---|---|---|---|---|---|---|---|---|
| Calcite | 16 | 54.9 | 85.3 | **22.3** | **30.8** | 72 | **38.3** | **65.7** | 61.9 |
| Quartz | 17.3 | 13 | 6.7 | **26.4** | **15.2** | 5.4 | **27.3** | **21.2** | 2.2 |
| Calcium Hemicarboaluminate | 48.7 | 26.6 | | **13.1** | **7.9** | | | | |
| Dicalcium Silicate | 3.4 | 5.5 | | **2.6** | **2.5** | | | **3.5** | |
| Portlandite | | | 8 | | | | | | |
| Gypsum | | | | **13** | **16.4** | | **15.6** | **5.5** | 6.3 |
| Ettringite | | | | **2** | **3.3** | | **2.5** | **4.1** | |
| Bassanite | | | | | | 22.5 | | | 26.6 |
| Amorphous % | 31.9 | 40.8 | 52.7 | **41.5** | **48.6** | 49 | **44.2** | **58** | 40.8 |

Referring to FIG. 5, it is appreciated that samples containing relatively higher Al:Si ratios and relatively higher calcium sulfate concentrations (e.g., samples 540, 550, 570, 580) exhibit the formation of elongate needle-like structures. The relatively high alumina and/or sulfate (from the calcium sulfate) contents of these samples can favor the formation of these structures, which are the at least partially hydrated and/or crystalline phases of calcium sulfoaluminates (CSA), such as ettringite. As discussed further herein, the early formation of CSA can be advantageous for strength gain and reducing the risk of future sulfate attacks. Therefore, a minimum alumina-to-silica ratio (e.g., at least 0.2) and/or a minimum sulfate concentration (e.g., at least 5,000 ppm) can be favored to achieve the properties of, e.g., samples 540, 550, 570, 580.

Referring to Table 8 above, samples having higher sulfate concentrations generally exhibit reduced amounts of calcium hemicarboaluminates and calcium sulfate phases (e.g., gypsum, bassanite). For example, focusing on samples 540, 550, 570, 580 as representative samples to be compared against one another (values thereof in Table 8 bolded for emphasis), as the sulfate concentration increases given a constant Al:Si ratio (e.g., comparing sample 540 to sample 570, comparing sample 550 to sample 580), the calcium hemicarboaluminate concentration becomes negligible. As another example, comparing sample 550 to sample 580, as the sulfate concentration increase, the gypsum concentration decreases from 16.4% to 5.5%. Furthermore, again focusing on samples 540, 550, 570, 580, the ettringite concentration increases as the sulfate concentration increases given a constant Al:Si ratio. Therefore, without being bound by theory, increasing the sulfate concentration is expected to cause the alumina from the calcium hemicarboaluminates and the sulfates from the calcium sulfates to form a new phase, such as CSA (e.g., ettringite), given the calcium content already present in the binders. Accordingly, the XRD analysis of the samples (as shown in Table 8) further supports the notion that a minimum amount of sulfate concentration can favor the formation of CSA and thus early strength gain.

Figure 6:
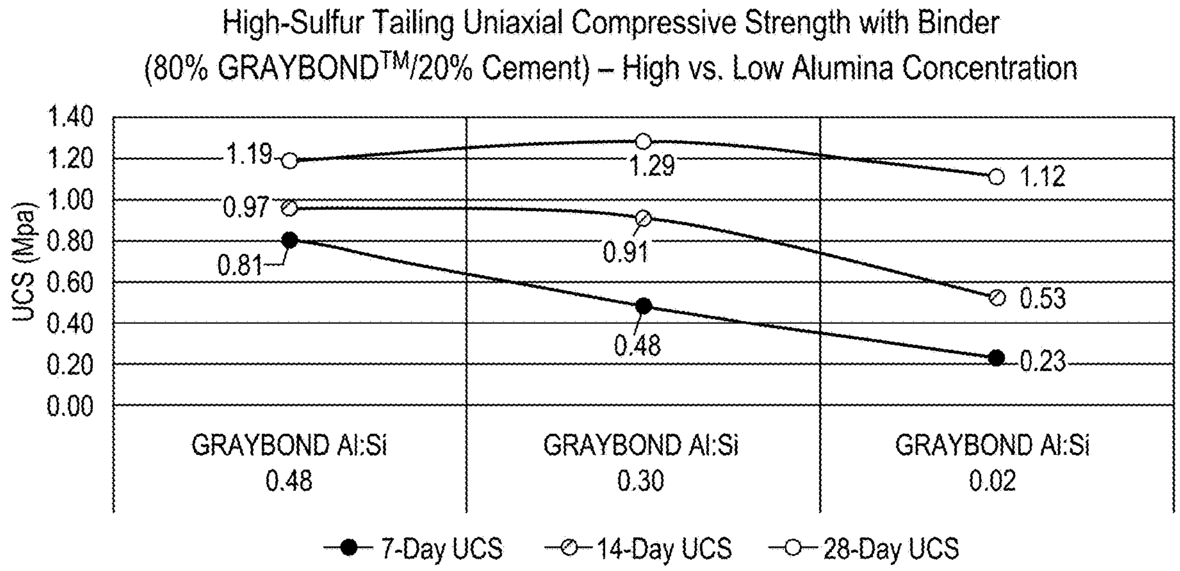
FIG. 6 illustrates a graph showing the development of the uniaxial compressive strength (UCS), over time, of high-sulfur tailings with binders having different alumina concentrations, in accordance with embodiments of the present technology.

FIG. 6 illustrates a graph showing the development of the uniaxial compressive strength (UCS), over time, of high-sulfur tailings with binders having different alumina concentrations. More specifically, the first column of data points corresponds to a binder have an Al:Si ratio of 0.48 ("Binder A"), the second column of data points corresponds to a binder have an Al:Si ratio of 0.30 ("Binder B"), and the third column of data points corresponds to a binder have an Al:Si ratio of 0.02 ("Binder C"). The data shown is based on tailings having 20% by weight Portland Cement and 80% by weight other supplementary cementitious materials (SCM), and the UCS was measured using 2 inch×2 inch×2 inch cubes.

As shown, the tailing with Binder A can have a UCS increasing from 0.81 MPa, to 0.97 MPa, and to 1.19 MPa at 7 days, 14 days, and 28 days, respectively. The tailing with Binder B can have a UCS increasing from 0.48 MPa, to 0.91 MPa, and to 1.29 MPa at 7 days, 14 days, and 28 days, respectively. The tailing with Binder C can have a UCS increasing from 0.23 MPa, to 0.53 MPa, and to 1.12 MPa at 7 days, 14 days, and 28 days, respectively.

Notably, although the tailings with the three different binders have generally similar UCS at 28 days (e.g., between 1.1-1.3 MPa), the tailing with Binder A exhibits earlier strength gain than the tailings with Binders B or C. Therefore, the Al:Si ratio is expected to affect the percentage of the UCS at 28 days achieved at 7 days or 14 days. For example, as shown in FIG. 6, Binder A, which has the highest alumina concentration among the three binders, achieves 0.81/1.19 or approximately 68% of its day 28 UCS at day 7. On the other hand, Binder B achieves 0.48/1.29 or approximately 37% of its day 28 UCS at day 7, and Binder C achieves 0.23/1.12 or approximately 21% of its day 28 UCS at day 7. Accordingly, compositions configured in accordance with embodiments of the present technology can achieve at least 25%, 30%, 35%, 40%, 45%, 50%, 55%, 60%, 65%, 70%, 75%, 80%, or more of their day 28 UCS at day 7.

Figure 7:
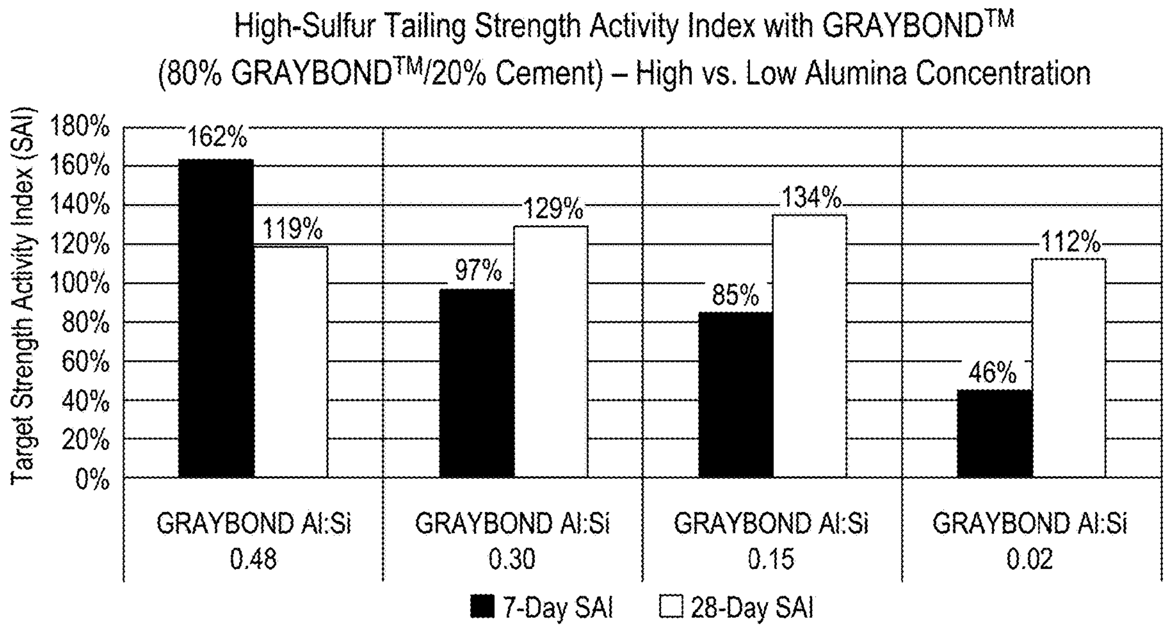
FIG. 7 illustrates a graph showing the target strength activity index (TSAI) of high-sulfur tailings with binders having different alumina concentrations at day 7 and day 28, in accordance with embodiments of the present technology.

FIG. 7 illustrates a graph showing the target strength activity index (TSAI) of high-sulfur tailings with binders having different alumina concentrations at day 7 and day 28. The TSAI can represent how the UCS of the tailing measures up against a target UCS for the given time. For example, in the illustrated graph, the target UCS for day 7 is set at 0.5 MPa and the target UCS for day 28 is set at 1.0 MPa. Moreover, FIG. 7 graphs the TSAI of four different tailings, corresponding to Binder A (Al:Si ratio of 0.48), Binder B (Al:Si ratio of 0.30), Binder C (Al:Si ratio of 0.02), and another binder, "Binder D" (Al:Si ratio of 0.15). As an illustrative example, Binder A has a day 7 UCS of 0.81 MPa (see FIG. 6), and given the target UCS of 0.5 MPa for day 7, the TSAI is calculated as 0.81/0.5 or 162%.

As shown, Binders A, B, C, D achieve generally the same TSAI for day 28 (e.g., between 110-135%. However, Binders A, B, C, D achieve substantially different TSAIs for day 7: 162% for Binder A, 97% for Binder B, 85% for Binder D, and 46% for Binder C. Accordingly, it is expected that the Al:Si ratio is positively correlated with the TSAI for day 7, at least for the Al:Si ratios represented (e.g., between 0.02 and 0.48). Therefore, compositions configured in accordance with embodiments of the present technology can achieve a TSAI for day 7 of at least 80%, 90%, 100%, 110%, 120%, 130%, 140%, 150%, 160%, or more. In some embodiments, the TSAI can be used to adjust one or more parameters of the composition. For example, referring to Binder A, because both the TSAI for day 7 and the TSAI for day 28 exceed 100%, it may be acceptable to, e.g., reduce the binder content percentage.

It is appreciated that the TSAI depends directly on the selected target UCS. As previously mentioned, the graph of FIG. 7 is based on a target UCS at day 7 of 0.5 MPa and a target UCS at day 28 of 1.0 MPa. The target UCSs, however, can be different depending on the specific application intended for the composition, the desired safety factor, and/or other factors. For example, the target UCS for building a bridge is expected to be different from the target UCS for decorative concrete. Accordingly, the TSAI can vary for the same composition depending on the target UCS, and may be application-specific.

Referring to FIGS. 1-7 together, the presence of relatively high alumina content in the composition can favor the formation of calcium sulfoaluminates (e.g., ettringite), which can enable strength development, as opposed to other phases such calcium sulfates (e.g., gypsum), which may not contribute to strength development. Furthermore, by also including a relatively high sulfate content, the composition can accelerate the formation of calcium sulfoaluminate phases, enabling early strength development compared to existing compositions. As a result, embodiments of the present technology can not only facilitate early strength gain, but also reduce the risk of future sulfate attacks (e.g., by using up the sulfates for early strength gain).

IV. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms “a,” “an,” and “the” include plural referents unless the context clearly indicates otherwise.

Reference herein to “one embodiment,” “an embodiment,” “some embodiments” or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, strength, and other numerical values used in the specification and claims, are to be understood as being modified in all instances by the term “about.” Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of “1 to 10” includes any and all subranges between (and including) the minimum value of 1 and the maximum value of 10, i.e., any and all subranges having a minimum value of equal to or greater than 1 and a maximum value of equal to or less than 10. As such, a range of “1-10” includes, for example, the values 2, 5.5, and 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

1. A formulation for use in the mining industry, the formulation comprising:
   - a lime-based cement extender or cement replacement composition, including:
     - lime particles comprising at least one of calcium hydroxide or calcium oxide and at
       - least 5% by weight of the composition, and pozzolan particles comprising silicon dioxide and aluminum oxide and forming at least
       - 50% by weight of the composition; and
   - aggregates comprising soluble sulfate,
   - wherein the formulation comprises at least 5,000 ppm of soluble sulfate, and
   - wherein the formulation has an alumina:silica ratio of at least 0.2:1.

2. The formulation of any one of the clauses herein, wherein the formulation is configured to achieve a long-term unconfined compressive strength (UCS) at day 28 since formation, and wherein the formulation is configured to achieve a short-term UCS at day 7 that is at least 50% of the long-term UCS.

3. The formulation of any one of the clauses herein, wherein the formulation is configured to achieve a long-term unconfined compressive strength (UCS) at day 28 since formation, and wherein the formulation is configured to achieve a short-term UCS at day 7 that is at least 65% of the long-term UCS.

4. The formulation of any one of the clauses herein, wherein the aggregates comprise at least 9,000 ppm of soluble sulfate.

5. The formulation of any one of the clauses herein, wherein the alumina:silica ratio is between 0.2:1 and 0.7:1.

6. The formulation of any one of the clauses herein, wherein the alumina:silica ratio is at least 0.6:1.

7. The formulation of any one of the clauses herein, wherein the aluminum oxide is configured to react with the soluble sulfate to form ettringite prior to 28 days since formation of the formulation.

8. The formulation of any one of the clauses herein, wherein the aluminum oxide is configured to favor formation of calcium sulfoaluminates over formation of calcium sulfates.

9. The formulation of any one of the clauses herein, wherein the aluminum oxide is configured to favor formation of ettringite over formation of thaumasite.

10. The formulation of any one of the clauses herein, wherein the formulation further comprises admixtures configured to accelerate a chemical reaction between the soluble sulfate of the aggregates and the aluminum oxide of the pozzolan particles.

11. The formulation of any one of the clauses herein, wherein the formulation further comprises admixtures configured to delay or prevent a chemical reaction between the soluble sulfate of the aggregates and the aluminum oxide of the pozzolan particles.

12. The formulation of any one of the clauses herein, wherein an unconfined compressive strength of the formulation 7 days since being formed is at least 1 MPa.

13. A lime-based cement extender or cement replacement composition, the composition comprising:

lime particles comprising at least one of calcium hydroxide or calcium oxide and forming at least 5% by weight of the composition; and pozzolan particles comprising at least 15% by weight aluminum oxide and silicon dioxide, and forming at least 50% by weight of the composition, wherein at least 90% of the lime particles and pozzolan particles are less than 75 microns, and wherein composition has an alumina:silica ratio of at least 0.2:1.

14. The composition of any one of the clauses herein, wherein the pozzolan particles include metakaolin and silica fume.

15. The composition of any one of the clauses herein, wherein the pozzolan particles comprise at least 35% by weight aluminum oxide.

16. The composition of any one of the clauses herein, wherein the alumina:silica ratio is between 0.2:1 and 0.7:1.

17. The composition of any one of the clauses herein, wherein the pozzolan particles comprise no more than 70% by weight silicon dioxide.

18. The composition of any one of the clauses herein, wherein the composition does not include limestone particles.

19. The composition of any one of the clauses herein, wherein the lime particles form 5-40% by weight of the composition.

20 The composition of any one of the clauses herein, wherein the pozzolan particles form between 60-95% by weight of the composition.

21. The composition of any one of the clauses herein, wherein the lime particles comprise a calcium concentration of at least 85% by weight.

22. A method of producing a formulation for use in the mining industry, the method comprising:

providing a lime-based composition including lime particles and pozzolan particles, wherein the lime particles have at least one of calcium hydroxide or calcium oxide, wherein the pozzolan particles have silicon dioxide and aluminum oxide, and wherein the lime-based composition has an alumina:silica ratio of at least 0.2:1; and combining the lime-based composition with aggregates having at least 5,000 ppm of soluble sulfate to form the formulation, wherein the formulation forms calcium sulfoaluminates prior to 28 days since formation of the formulation.

23. The method of any one of the clauses herein, wherein the pozzolan particles comprise at least 35% by weight aluminum oxide.

24. The method of any one of the clauses herein, further comprising combining the composition with admixtures configured to accelerate formation of calcium aluminum sulfates by accelerating a chemical reaction between soluble sulfate of the aggregates and the aluminum oxide of the pozzolan particles.

25. The method of any one of the clauses herein, wherein the formulation inhibits formation of calcium sulfoaluminates after 28 days since formation of the formulation.

26. A lime-based cement extender or cement replacement composition, the composition comprising:

lime particles comprising at least one of calcium hydroxide or calcium oxide and at least 5% by weight of the composition; and pozzolan particles comprising at least one of silicon dioxide or aluminum oxide and at least 60% by weight of the composition, wherein at least 90% of the lime particles and pozzolan particles are less than 75 microns.

27. The composition of any one of the clauses herein, wherein the composition does not include limestone particles.

28. The composition of any one of the clauses herein, wherein the lime particles comprise 5-40% by weight of the composition.

29. The composition of any one of the clauses herein, wherein the pozzolan particles comprise 60-95% by weight of the composition.

30. The composition of any one of the clauses herein, wherein:

the lime particles comprise about 5% by weight of the composition, and the pozzolan particles comprise about 95% by weight of the composition.

31. The composition of any one of the clauses herein, wherein:

the lime particles comprise about 40% by weight of the composition, and the pozzolan particles comprise about 60% by weight of the composition.

32. The composition of any one of the clauses herein, wherein the pozzolan particles comprise no more than 70% by weight silicon dioxide.

33. The composition of any one of the clauses herein, wherein the pozzolan particles comprise at least 15%, 20%, 25%, 30%, or 35% by weight aluminum oxide.

34. The composition of any one of the clauses herein, wherein an aluminum oxide to silicon dioxide ratio of the composition is between 0.15:1 and 0.45:1.

35 The composition of any one of the clauses herein, wherein the lime particles comprise a calcium concentration of at least 85%, 90%, 91%, 92%, 93%, 94% or 95% by weight.

36. The composition of any one of the clauses herein, wherein the lime particles comprise at least one of quicklime, hydrated lime, or dolomitic lime.

37. The composition of any one of the clauses herein, wherein the pozzolan particles comprise clay, lithium residues, or hard rock pozzolans.

38. The composition of any one of the clauses herein, wherein the pozzolan particles comprise spodumene.

39. The composition of any one of the clauses herein, wherein at least 99% of the lime particles and pozzolan particles are less than 75 microns.

40. A formulation for use in the mining industry, comprising:

the lime-based cement extender or cement replacement composition of any one of the clauses herein; and aggregates comprising at least 5,000 ppm of soluble sulfate.

41 The formulation of any one of the clauses herein, wherein the pozzolan particles comprise aluminum oxide, and wherein the aluminum oxide is configured to react with the soluble sulfate to form ettringite.

42. The formulation of any one of the clauses herein, wherein the pozzolan particles comprise aluminum oxide, and wherein the aluminum oxide is configured to favor formation of ettringite over formation of thaumasite.

43. The formulation of any one of the clauses herein, wherein the aggregates comprise at least one of sodium sulfate, calcium sulfate, magnesium sulfate, potassium sulfate, iron sulfate, or ammonium sulfate.

44. The formulation of any one of the clauses herein, wherein the aggregates comprise at least 9,000 ppm of soluble sulfate.

45. The formulation of any one of the clauses herein, further comprising admixtures configured to accelerate a chemical reaction between soluble sulfate of the aggregates and the aluminum oxide of the pozzolan particles.

46. The formulation of any one of the clauses herein, further comprising admixtures configured to delay a chemical reaction between soluble sulfate of the aggregates and the aluminum oxide of the pozzolan particles.

47. The formulation of any one of the clauses herein, further comprising admixtures configured to prevent a chemical reaction between soluble sulfate of the aggregates and the aluminum oxide of the pozzolan particles.

48. The formulation of any one of the clauses herein, wherein the unconfined compressive strength of the formulation 7 days of being formed is at least 0.5 MPa, 1 MPa, 2 MPa, 3 MPa, 4 MPa, or 5 MPa.

49. A method of producing a formulation for use in the mining industry, the method comprising:

milling, via a mill, feed components comprising lime particles and pozzolan particles to produce a milled blend, wherein the milled blend comprises at least 5% by weight of the lime particles and at least 60% by weight of the pozzolan particles, wherein the pozzolan particles comprise at least 15% by weight aluminum oxide;

separating oversized particles from the milled blend to produce a lime-based cement extender or cement replacement composition such that 90% of the particles of the lime-based cement extender or cement replacement composition pass 200 mesh; and combining the composition with aggregates to form the formulation.

50 The method of any one of the clauses herein, wherein the pozzolan particles comprise at least 20% by weight aluminum oxide.

51. The method of any one of the clauses herein, wherein the pozzolan particles comprise no more than 70% silicon dioxide by weight.

52. The method of any one of the clauses herein, further comprising combining the composition with admixtures configured to accelerate formation of calcium aluminum sulfates by accelerating a chemical reaction between soluble sulfate of the aggregates and the aluminum oxide of the pozzolan particles.

53. A method of producing a formulation for use in the mining industry, the method comprising:

milling, via a mill, feed components comprising lime particles and pozzolan particles to produce a milled blend, wherein the milled blend comprises at least 5% by weight of the lime particles and at least 60% by weight of the pozzolan particles;

separating oversized particles from the milled blend to produce a lime-based cement extender or cement replacement composition such that 90% of the particles of the lime-based cement extender or cement replacement composition pass 200 mesh;

combining the composition with admixtures; and combining the composition and the admixtures with aggregates to form a formulation, wherein the admixtures are configured delay formation of calcium aluminum sulfates by delaying a chemical reaction between soluble sulfate of the aggregates and the aluminum oxide of the pozzolan particles.

What is claimed is:

1. A formulation for use in the mining industry, the formulation comprising:

a lime-based cement extender or cement replacement composition, including:

lime particles of at least 5% by weight of the composition, wherein the lime particles comprise at least one of calcium hydroxide or calcium oxide, and pozzolan particles of at least 50% by weight of the composition, wherein the pozzolan particles comprise silicon dioxide and aluminum oxide; and aggregates comprising (i) mine tailings and/or mine waste and (ii) at least 5,000 ppm of soluble sulfate, and wherein the formulation has an alumina:silica ratio of at least 0.2:1.

2. The formulation of claim 1, wherein the formulation is configured to achieve a long-term unconfined compressive strength (UCS) at day 28 since formation, and wherein the formulation is configured to achieve a short-term UCS at day 7 that is at least 50% of the long-term UCS.

3. The formulation of claim 1, wherein the formulation is configured to achieve a long-term unconfined compressive strength (UCS) at day 28 since formation, and wherein the formulation is configured to achieve a short-term UCS at day 7 that is at least 65% of the long-term UCS.

4. The formulation of claim 1, wherein the aggregates comprise at least 9,000 ppm of soluble sulfate.

5. The formulation of claim 1, wherein the alumina:silica ratio is between 0.2:1 and 0.7:1.

6. The formulation of claim 1, wherein the alumina:silica ratio is at least 0.6:1.

7. The formulation of claim 1, wherein the aluminum oxide is configured to react with the soluble sulfate to form ettringite prior to 28 days since formation of the formulation.

8. The formulation of claim 1, wherein the aluminum oxide is configured to favor formation of calcium sulfoaluminates over formation of calcium sulfates.

9. The formulation of claim 1, wherein the aluminum oxide is configured to favor formation of ettringite over formation of thaumasite.

10. The formulation of claim 1, wherein the formulation further comprises admixtures configured to accelerate a chemical reaction between the soluble sulfate of the aggregates and the aluminum oxide of the pozzolan particles.

11. The formulation of claim 1, wherein the formulation further comprises admixtures configured to delay or prevent a chemical reaction between the soluble sulfate of the aggregates and the aluminum oxide of the pozzolan particles.

12. The formulation of claim 1, wherein an unconfined compressive strength of the formulation 7 days since being formed is at least 1 MPa.

13. The formulation of claim 1, wherein the sulfide aggregates comprise iron sulfides.

14. The formulation of claim 1, wherein the de aggregates comprise pyrite.

15. The formulation of claim 1, wherein the lime particles, the pozzolan particles, and the aggregates are configured to favor formation of calcium sulfoaluminates.

16. The formulation of claim 1, wherein the lime particles, the pozzolan particles, and the aggregates are configured to form calcium sulfoaluminates prior to 28 days since formation of the formulation.

17. The formulation of claim 16, wherein the calcium sulfoaluminates comprise ettringite.

18. A method of producing a formulation for use in the mining industry, the method comprising:

providing a lime-based composition including lime particles and pozzolan particles, wherein the lime particles have at least one of calcium hydroxide or calcium oxide, wherein the pozzolan particles have silicon dioxide and aluminum oxide, and wherein the lime-based composition has an alumina:silica ratio of at least 0.2:1; and combining the lime-based composition with aggregates comprising (i) mine tailings and/or mine waste and (ii) at least 5.000 ppm of soluble sulfate to form the formulation, wherein the formulation forms calcium sulfoaluminates prior to 28 days since formation of the formulation.

19. The method of claim 18, wherein the pozzolan particles comprise at least 35% by weight aluminum oxide.

20. The method of claim 18, further comprising combining the composition with admixtures configured to accelerate formation of calcium aluminum sulfates by accelerating a chemical reaction between the soluble sulfate of the aggregates and the aluminum oxide of the pozzolan particles.

21. The method of claim 18, wherein the formulation inhibits formation of calcium sulfoaluminates after 28 days since formation of the formulation.

* * * * *